United States Patent
Varadarajan et al.

(10) Patent No.: US 10,430,966 B2
(45) Date of Patent: Oct. 1, 2019

(54) ESTIMATING MULTI-PERSON POSES USING GREEDY PART ASSIGNMENT

(71) Applicant: INTEL CORPORATION, Santa Clara, CA (US)

(72) Inventors: Srenivas Varadarajan, Bangalore (IN); Omesh Tickoo, Portland, OR (US); Parual Datta, Bangalore (IN)

(73) Assignee: Intel Corporation, Santa Clara, CA (US)

(*) Notice: Subject to any disclaimer, the term of this patent is extended or adjusted under 35 U.S.C. 154(b) by 238 days.

(21) Appl. No.: 15/480,204

(22) Filed: Apr. 5, 2017

(65) Prior Publication Data

US 2018/0293753 A1    Oct. 11, 2018

(51) Int. Cl.
   *G06T 7/73* (2017.01)
   *G06K 9/00* (2006.01)
   *G06K 9/62* (2006.01)

(52) U.S. Cl.
   CPC ............ *G06T 7/73* (2017.01); *G06K 9/00369* (2013.01); *G06K 9/00778* (2013.01);
   (Continued)

(58) Field of Classification Search
   CPC .......... G06K 9/00228; G06K 9/00664; G06K 9/00362; G06K 9/6214; G06K 9/6292; G06K 9/00369; G06K 9/00778; G06K 9/00771; G06K 9/00288; G06K 9/00201; G06K 9/00335; G06K 9/3241; G06K 9/00281; G06K 9/00221; G06K 9/00295; G06K 9/627; G06K 9/00342;
   (Continued)

(56) References Cited

U.S. PATENT DOCUMENTS 7,742,623 B1 * 6/2010 Moon ................ G06K 9/00604
                                                382/103
7,912,246 B1 * 3/2011 Moon ................ G06K 9/00221
                                                382/103
(Continued)

OTHER PUBLICATIONS

Chen et al., "Parsing Occluded People by Flexible Compositions", Computer Vision and Pattern Recognition(CVPR), 2015, 9 pages, USA.
(Continued)

*Primary Examiner* — Aklilu K Woldemariam
(74) *Attorney, Agent, or Firm* — International IP Law Group, P.L.L.C.

(57) ABSTRACT

An example apparatus for estimating poses includes a person estimator to estimate a number of people based on a significant head count of received refined part detections. The apparatus includes a detection clusterer to cluster the refined part detections based on the estimated number of people to generate clustered part detections. The apparatus includes a candidate selector to select candidate person clusters for each clustered part detection based on proximity to the clustered part detection. The apparatus includes a sequential assigner to calculate a cluster affinity score for each combination of candidate person cluster and clustered part detection, and greedily sequentially assign each clustered part detection to a candidate person cluster based on the cluster affinity score to generate person clusters. The apparatus includes a pose generator to generate a pose for each person cluster.

20 Claims, 13 Drawing Sheets

(52) U.S. Cl.
CPC ......... *G06K 9/6224* (2013.01); *G06K 9/6223* (2013.01); *G06T 2207/20084* (2013.01); *G06T 2207/30196* (2013.01); *G06T 2207/30242* (2013.01)

(58) Field of Classification Search
CPC .... G06K 9/00597; G06K 9/3233; G06K 9/66; G06K 7/1456; G06K 9/6277; G06T 2207/30196; G06T 2207/30242; G06T 7/20; G06T 7/521; G06T 2207/10016; G06T 7/62; G06T 7/285; G06T 7/74; G06T 2207/30244; G06T 2207/10028; G06T 17/20; G06T 7/0002; H04N 21/4223; H04N 21/44218; H04N 21/44231; H04N 5/145; G07C 9/00; A61B 5/1072; A61B 5/1176; A61B 5/1121; G08B 13/19608; G08B 13/1961; G01C 1/00; G06Q 30/0242; G06Q 30/0269; G06Q 20/3674; G06Q 30/02; G06Q 30/0251; G06N 3/0454; G06N 20/00; A63B 60/46; A63B 2220/24
USPC .... 382/100, 103, 118, 224, 226; 705/49, 52, 705/58, 67
See application file for complete search history.

(56) References Cited

U.S. PATENT DOCUMENTS

| | | | | |
|---|---|---|---|---|
| 9,317,785 | B1* | 4/2016 | Moon | G06K 9/00234 |
| 9,600,982 | B2* | 3/2017 | MacIntosh | |
| 2008/0109397 | A1* | 5/2008 | Sharma | G06Q 30/02 |
| 2008/0298643 | A1* | 12/2008 | Lawther | G06K 9/00288 |
| | | | | 382/118 |
| 2009/0091798 | A1* | 4/2009 | Lawther | G06F 16/58 |
| | | | | 358/3.28 |
| 2009/0185723 | A1* | 7/2009 | Kurtz | G06K 9/00288 |
| | | | | 382/118 |
| 2010/0124357 | A1* | 5/2010 | Hampapur | G06K 9/00778 |
| | | | | 382/103 |
| 2012/0207346 | A1* | 8/2012 | Kohli | G06K 9/00369 |
| | | | | 382/103 |
| 2013/0038694 | A1* | 2/2013 | Nichani | G06T 7/20 |
| | | | | 348/46 |
| 2013/0230211 | A1* | 9/2013 | Tanabiki | G06K 9/00342 |
| | | | | 382/103 |
| 2013/0230245 | A1* | 9/2013 | Matsumoto | G06K 9/00778 |
| | | | | 382/173 |
| 2014/0348382 | A1* | 11/2014 | Sasatani | G06K 9/00369 |
| | | | | 382/103 |
| 2015/0049910 | A1* | 2/2015 | Ptucha | G06F 16/51 |
| | | | | 382/103 |
| 2015/0109337 | A1* | 4/2015 | Hofmann | G06T 7/0002 |
| | | | | 345/633 |
| 2015/0109528 | A1* | 4/2015 | Choi | H04N 5/145 |
| | | | | 348/460 |
| 2015/0213305 | A1* | 7/2015 | Sundstrom | G06F 16/00 |
| | | | | 382/118 |
| 2017/0161547 | A1* | 6/2017 | Segawa | G06T 7/75 |
| 2017/0169297 | A1* | 6/2017 | Bernal | G06K 9/00369 |
| 2018/0082314 | A1* | 3/2018 | Faith | G06Q 30/0201 |
| 2018/0293753 | A1* | 10/2018 | Varadarajan | G06T 7/73 |

OTHER PUBLICATIONS

Eichner et al., "We are family:Joint Pose Estimation of Multiple Persons", 11th European Conference on Computer Vision, Heraklion, Crete, Greece, 2010, 15 pages, Switzerland.
He et al., "Deep Residual Learning for Image Recognition", International Conference on Machine Learning, 2016, 12 pages, USA.
Insafutdinov et al., "DeeperCut: A Deeper, Stronger, and Faster Multi-Person Pose Estimation Model", European Conference on Computer Vision, 2016, 22 pages, Europe.
Iqbal et al., Multi-Person Pose Estimation with Local Joint-to-Person Associations, European Conference on Computer Vision, 2016, 15 pages, Europe.
Pishchulin et al., "DeepCut: Joint Subset Partition and Labeling for Multi Person Pose Estimation", Computer Vision and Pattern Recognition, 2016, 9 pages, Germany.
Simo-Serra et al., "A Joint Model for 2D and 3D Pose Estimation from a Single Image", Computer Vision and Pattern Recognition, 2013, 8 pages, Spain.
MPII, "MPII Human Pose Dataset", http://human-pose.mpi-inf.mpg.de/, date viewed Apr. 5, 2017, 1 page, Germany.

* cited by examiner

300B

300A

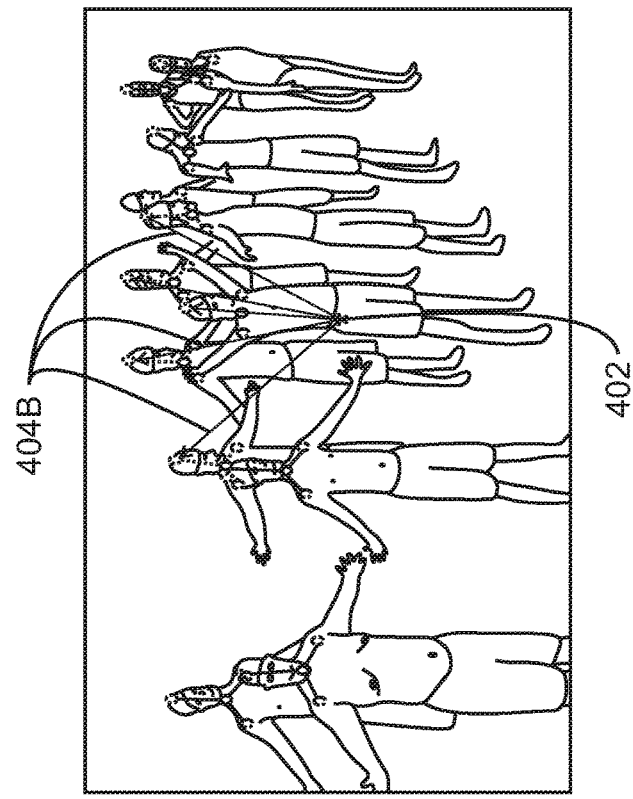
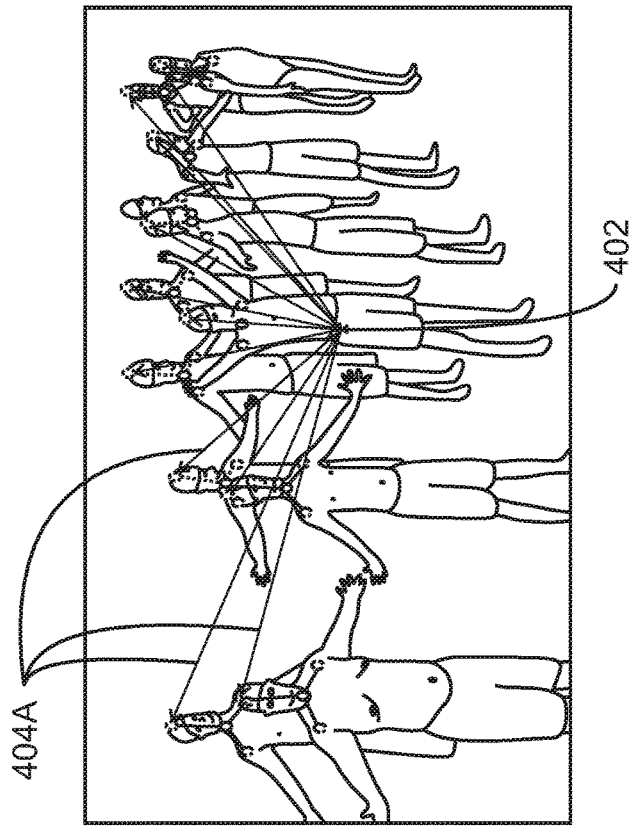
FIG. 4A
FIG. 4B

600A

600B

700A

ESTIMATING MULTI-PERSON POSES USING GREEDY PART ASSIGNMENT

BACKGROUND

Some systems may use human pose detection for action recognition, human object interaction, or computing object affordances. In examples, a human pose refers to configuration of human body parts like head, neck, elbow, etc., in a 3D space or in a 2D image.

BRIEF DESCRIPTION OF THE DRAWINGS

FIGS. 4A and 4B are diagrams illustrating an example candidate person cluster selection;

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
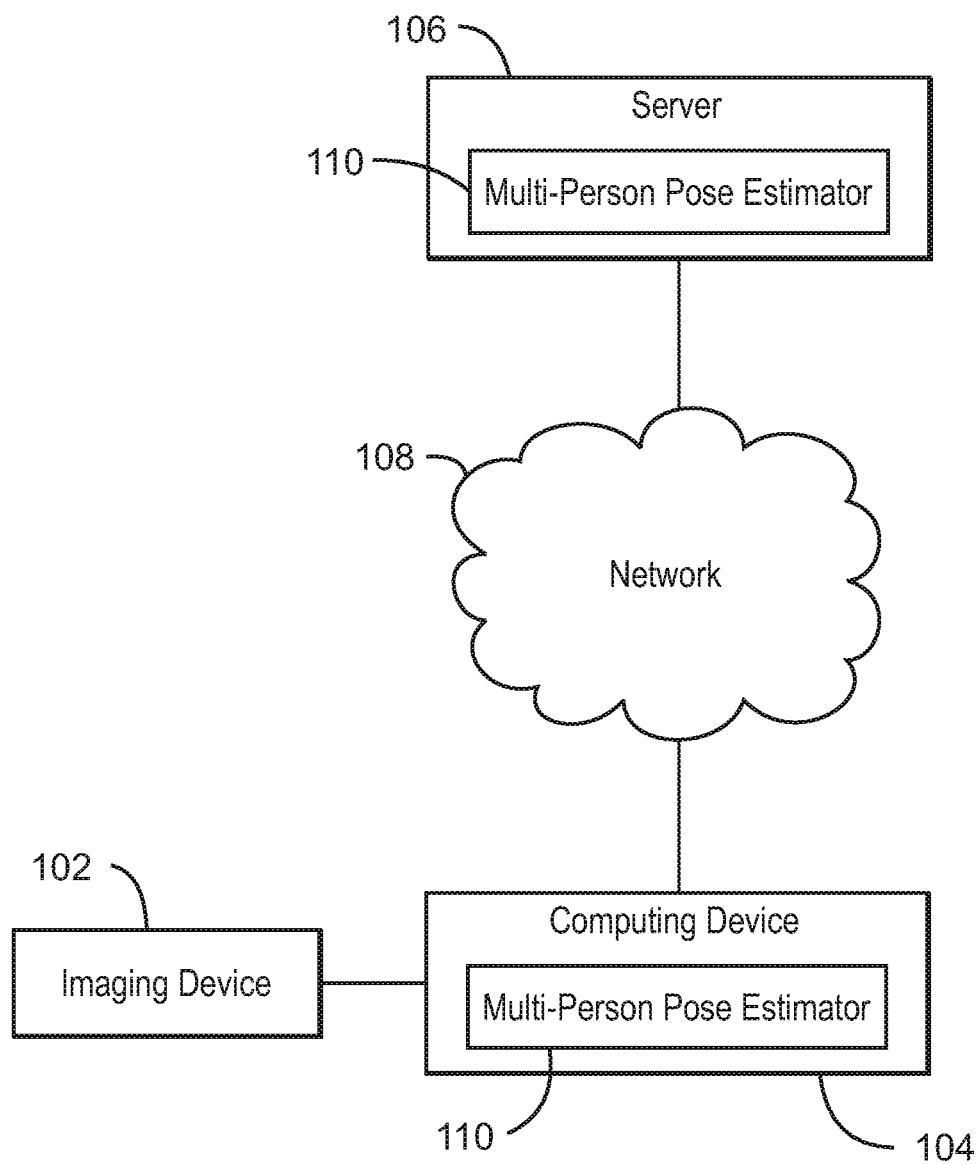
FIG. 1 is a block diagram illustrating an example system for estimating multi-person poses.

Detecting human poses may be used for action recognition, human object interaction recognition, and for computing object affordances. However, in a scene with many people, human pose-estimation may be difficult due to overlapping body parts and visibility of a subset of body parts. For example, visibility may be limited to a subset of body parts due to self, mutual, and environmental occlusions.

Moreover, approaches formulating the multi-person pose-estimation as an Integer Linear Programming (ILP) may be extremely time consuming when performed on all body part candidates of an image. Some approaches may divide the body part candidates into upper, middle and lower body parts and execute a multi-stage ILP to speed up pose-estimation. For example, Multi-Person Pose Estimation with Local Joint-to-Person Associations may first estimate the human bounding boxes and the perform ILP on the body part candidates falling in each of the bounding boxes. However, even this approach may take about 480 seconds per image on some datasets.

The present disclosure relates generally to techniques for performing multi-person pose-estimation in real-time. More specifically, the techniques described herein include a fast algorithm for grouping human body part detections to individual person clusters. Further, the techniques described herein include an apparatus, method and system for estimating multi-person poses. An example apparatus includes a receiver to receive body part candidates. For example, the receiver may receive the body part candidates from a neural network trained in advance to detect the body part candidates. For example, the neural network may have been trained to detect body part candidates using sample images of various body parts. In some examples, the neural network may be a convolutional neural network or a deep neural network. The apparatus also includes a refiner to refine the body part candidates to generate refined part detections. For example, the refiner may refine received body part candidates based on non-maximal suppression, location refinement of detections, or unary probability thresholding. The apparatus further includes a person estimator to estimate a number of people based on a significant head count of the refined part detections. For example, the apparatus can detect a significant head based on a unary probability for each detected head exceeding a threshold probability. As used herein, a unary probability refers to probability that a particular region is part of particular body part. The apparatus also includes a detection clusterer to cluster the refined part detections based on the estimated number of people to generate clustered part detections. The apparatus further includes a candidate selector to select a number of candidate person clusters for each clustered part detection based on proximity to the clustered part detection. In some examples, the apparatus can cluster the refined part detections based on a spatial k-means clustering. The apparatus further includes a sequential assigner to calculate a cluster affinity score for each combination of candidate person cluster and clustered part detection, and greedily sequentially assign each clustered part detection to a candidate person cluster based on the cluster affinity score to generate person clusters. In some examples, the apparatus can calculate the cluster affinity score for each combination based on a received pairwise probability between the clustered part detection and one or more predecessor parts of the candidate person cluster. As used herein, a pairwise probability refers to a probability of two body parts occurring in two locations that belong to the same individual. For some body parts, the apparatus can use the co-occurrence probabilities of a considered part with a specific subset of pre-assigned parts while determining a person cluster. The apparatus further includes a hallucination suppressor to detect and suppress hallucinated parts. In some examples, the apparatus can suppress hallucinated parts through the use of a structural compliance probability score. The apparatus further includes a displayer to display detected multi-person pose estimation results.

The techniques described herein thus solve the multi-person pose-estimation problem in real-time by estimating the number of people in the image and greedily sequentially assigning detected body parts to clusters. The techniques described herein may first determine which pixel locations contain human body parts. Then, the present techniques may then classify each detected body part to a part class. For example, a part class may be a head, a neck, or an elbow. Finally, the techniques described herein may assign each of the classified body parts to a person cluster. The present techniques thus avoid performing ILP, but still achieve a higher accuracy. For example, the techniques herein can achieve a speed up of 600 times compared to some Deep Neural Network solutions and 4-5 orders of magnitude compared to some other techniques through the reduction in the body part candidates, the number of candidate clusters, and the pair-wise constraints. The techniques described herein also can achieve 7% higher accuracy than some techniques. Further, the techniques described herein may also be up to 8 times faster than the fastest known pose-estimation method, while achieving a 22% higher part detection accuracy than the same method. For example, in an experiment, including mostly upper bodies of people, the techniques described herein achieved a speed up of 4 times compared to another method, and also had a higher accuracy. The techniques described herein are therefore both faster and more accurate than any of the published methods on two different multi-person pose datasets. Moreover, the techniques described herein are agnostic to the neural network used in the generation of unary and pairwise probability confidence maps.

FIG. 1 is a block diagram illustrating an example system for estimating multi-person poses. The example system is referred to generally by the reference number 100 and can be implemented in the computing device 900 of FIG. 9 described below using the method 700 of FIG. 7 described below.

The example system 100 includes an imaging device 102. For example, the imaging device 102 can be a camera. The system 100 further includes a computing device 104, a server 106, and a network 108. For example, the computing device can be a hand-held device, such as a tablet or smartphone. In some examples, the server 106 can be a cloud computing node. In some examples, the network 108 can be any suitable network, including the Internet.

As shown in FIG. 1, both the computing device 104 and the server 106 include a multi-person pose estimator 110. In some examples, the computing device 104 may receive one or more images from the imaging device 102 and process the images using the multi-person pose estimator 110. For example, the multi-person pose estimator 110 may estimate and generate a number of poses of a plurality of people in the one or more images form the imaging device 102. The generated poses can then be used by the computing device 104 to enable action recognition or human object interaction tasks.

In some examples, the computing device 104 may receive images from the imaging device 102 and send the images to the server 106 to be processed by the multi-person pose estimator 110 of the server 106. The computing device 104 may then receive one or more generated poses from the server 106.

In some examples, the multi-person pose estimator 110 may estimate the number of persons in a received image by the number of human parts of a class. As used herein, a part class, also referred to herein as a part type, may be a head, neck, left shoulder, right shoulder, etc. For example, the multi-person pose estimator 110 may use the number of heads to estimate the number of persons. In examples, the head may be more prominently detectable part in a crowded scene with mutual occlusions. In some examples, the part candidates of a particular part of a particular person may be spatially proximal to each other and can be reduced by the multi-person pose estimator 110 to one location through K-means clustering. For example, the K-means clustering may be used to partition n body part candidates into k clusters in which each body part candidate belongs to the cluster with the nearest mean. These spatially proximal body part candidates may be referred to herein as part clusters and the multi-person pose estimator may retain one part, referred to herein as a clustered part detection, from each part cluster. In some examples, the multi-pose estimator 110 can initialize person clusters based on head locations and assigns other parts to each of them, progressively moving from head to ankle. As used herein, a person cluster refers to already grouped body parts. For example, the body parts of a particular type may be progressively added to their respective partial person clusters in parallel. In some examples, while assigning a body part to a partial person cluster, nearby person clusters may be considered rather than a farther person clusters. For example, a threshold distance or number of nearby person clusters may be used for selecting person clusters to consider. In some examples, co-occurrence probabilities of a considered part with one or more previously assigned parts, referred to herein as predecessors, in each person cluster can be used to determine the final person cluster for assigning the part. For example, the co-occurrence probabilities may be used to calculate a cluster affinity score to greedily sequentially assign each clustered part detection to a candidate person cluster based on the cluster affinity score. In some examples, in order to account for profile views of persons, predecessors from one side may not be used for computing the co-occurrence probabilities for parts on the other side. For example, the predecessor used for computing each co-occurrence probability may be on the same side of a body as the associated clustered part detection. In some examples, the multi-person pose estimator 110 can use a combination of unary probabilities and pairwise probabilities with predecessors in the assigned person cluster to detect hallucination of parts and the detected hallucinated parts can be suppressed. These techniques are described in greater detail with respect to FIGS. 2-10 below.

The diagram of FIG. 1 is not intended to indicate that the example system 100 is to include all of the components shown in FIG. 1. Rather, the example system 100 can be implemented using fewer or additional components not illustrated in FIG. 1 (e.g., additional imaging devices, computing devices, servers, networks, etc.).

Figure 2:
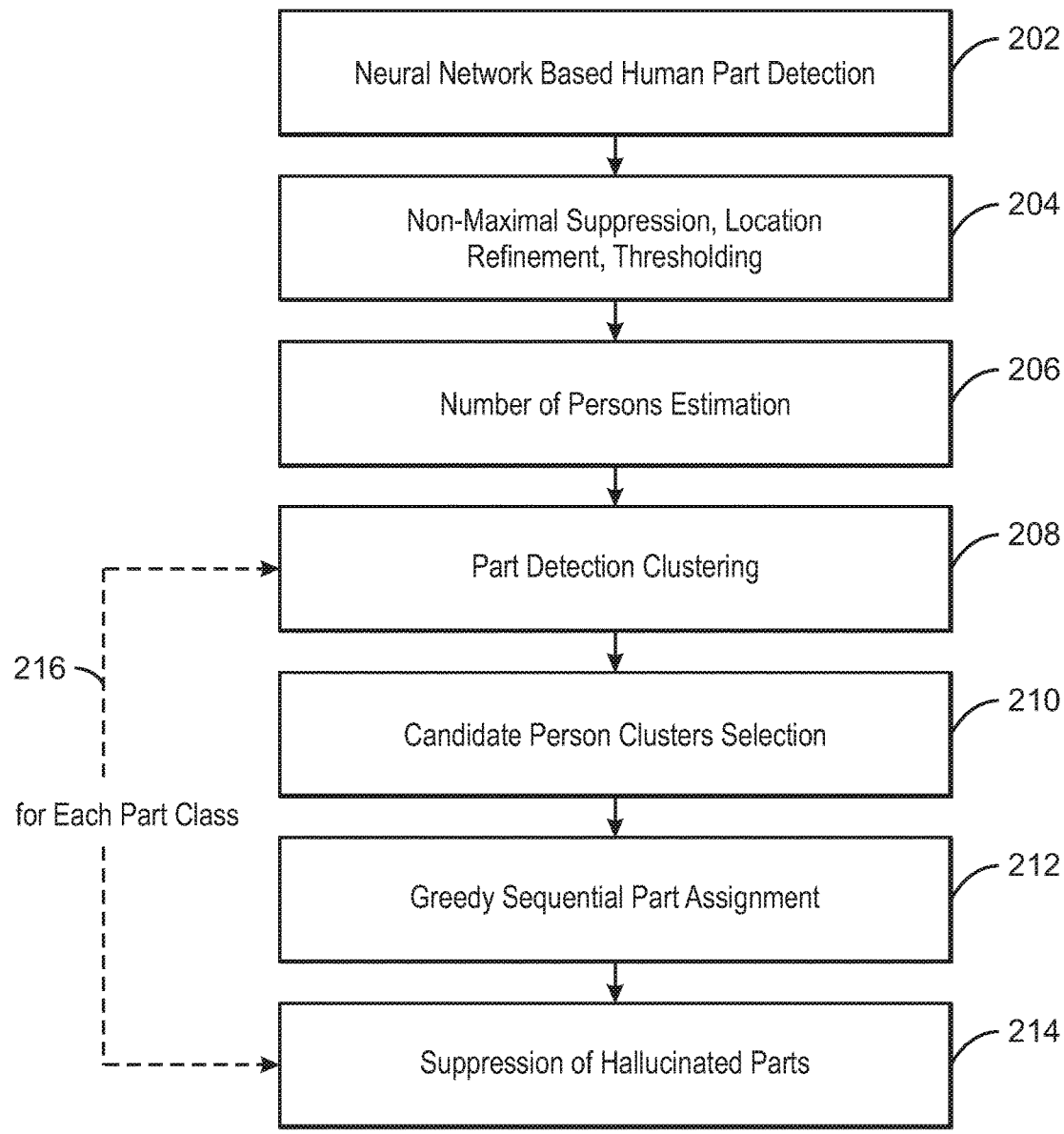
FIG. 2 is a flow chart illustrating an example process for estimating multi-person poses.

FIG. 2 is a flow chart illustrating an example process for estimating multi-person poses. The example process is generally referred to by the reference number 200 and can be implemented in the multi-person pose estimator 110 of the computing device 104 or server 106 FIG. 1 above, the computing device 900 of FIG. 9 below, or the computer readable media 1000 of FIG. 10 below.

At block 202, the body parts in the considered input image are detected using a neural network. For example, the neural network may be a convolutional neural network (CNN) or a deep neural network (DNN). The unary probabilities of the part detections and the pairwise probabilities between the part detections may be obtained from the neural network. In some examples, the images may have been detected using any suitable image method of detection.

At block 204, non-maximal suppression of part detections, location refinement of part detections, and removal of insignificant part detections by thresholding based on unary probabilities may be performed. For example, part detections with unary probabilities less than a threshold probability may be removed to achieve non-maximal suppression of part detections. The refined body part candidates obtained from these initial steps can then be further partitioned into person clusters as described below. In some examples, the images may be refined using any suitable method of refining part detections.

At block 206, a number of persons in an image may be estimated. For example, instead of using a separate face-detector for detecting heads, the process may use head-detections from the neural network and retain only the significant heads. For example, significant heads may have unary probabilities that exceed a threshold probability. The threshold probability may be, for example, a probability of 0.5. In some examples, if there multiple heads are detected in a small local region of N×N pixels, then the head with the highest unary probability may be retained, while other heads may be suppressed. For example, the unary probabilities of the part detections and the pairwise probabilities between the part detections may also be obtained from the neural network. In some examples, a number of people in the image, H, may be estimated based on the number of significant heads.

At block 208, a part detection clustering is performed. The part detections provided by the neural network may be larger in number. Even after non-maximal suppression and location refinement the steps of block 204 above, a large number of detections per part class may remain. Since the complexity of part assignment to person clusters may increase exponentially as a function of body part candidates, the number of body part candidates may be reduced in order to achieve a faster pose estimation. For example, the number of part detections may be limited to the number of estimated persons in the image through a clustering algorithm. In some examples, a spatial K-means clustering may be performed on all the part detections of a particular part type. For example, a value for K in the spatial K-means clustering may be taken as H+2, where H is the number of detected significant heads. Two additional cluster centers may be permitted at this stage in order to accommodate parts belonging to partially visible people. The cluster centers of these spatial clusters need not coincide with a part center, where the part center refers to the center of a part. For example, qualifying the cluster-centers directly for person-assignment may lead to a larger error. Instead, in some examples, the nearest part detection from each cluster center may be qualified for the next stage. In some examples, if there are more than one close part detection, then the part detection with the highest unary probability may be retained for the next step. An example part detection clustering technique is described with respect to FIGS. 3A and 3B below.

At block 210, a candidate person clusters selection is performed. In some examples, once a set of body part candidates are selected in the previous step 208, they may be assigned to the correct partial person clusters. For example, each of these partial clusters may include part detections that were already assigned prior to the part-assignment at this block. In some examples, an M number of more proximal person clusters may be considered as candidates for assigning a part. In some examples, a value of M=5 may be used. For example, a spatial proximity may be computed as the distance between the part detection's location and the candidate cluster's head location. Reducing the number of candidate clusters may thus reduce the number of pairwise probability comparisons performed with those clusters' parts.

At block 212, a greedy sequential part assignment is performed. For example, the greedy sequential part assignment may be performed top-down from head to ankle. As used herein, greedy assignment refers to making locally better choices at each stage with a goal of eventually finding a global outcome that is better. In some examples, the greedy sequential assignment may start from the heads because the human head may be the most reliable human part to detect in images. In some examples, more significant heads may be detected first and this confidence may be progressively expanded over the connected parts. For example, while assigning a detection, d, of part class c to one of the considered part cluster candidates, β, the pairwise probabilities between the considered part, d, and the pre-assigned parts of a candidate person cluster, β, may be used to compute a cluster affinity score, $\pi(\beta,d)$, for that part with respect to the candidate person cluster. The greedy sequential part assignment can be thus performed using the equation:

$$\pi(\beta, d) = \frac{1}{|\beta|} \sum_{\substack{i \in Predecessor(c) \\ i \in \beta}} P_{dcd'i} \qquad \text{Eq. 1}$$

where d' is the location of the pre-assigned part of class, i, in the candidate cluster β, and |β| is the cardinality of β. The part detection may be assigned to the cluster, $\beta_{max}$, with the maximum cluster affinity score, $\pi(\beta\_max, d)$. In some examples, a specific sub-set of previously assigned parts may be used as predecessors that have a significant influence on the current part. An example set of predecessors for the various parts are shown in the table included in the description of FIG. 5 below. For example, the predecessors may be previously assigned parts to a person cluster that may be used for assigning additional parts. In some examples, the predecessors can be limited to pre-assigned parts on the same side to accommodate profile views of people. In some examples, heads and necks may be used as predecessors to all other upper body parts. For example, the head and the neck may be more reliably detectable.

At block 214, a suppression of hallucinated parts is performed. As used herein, a hallucinated part may be a falsely detected body part. For example, the hallucinated part may have been detected due to occluded parts or backgrounds that appear similar to body parts. As described above, the number of visible parts of each part class may be estimated to be approximately the number of people in the image. However, this may not be true in cases where not all the parts of each person is visible in the image. In some cases, additional parts may be detected in arbitrary locations where a part is not truly present. Thus, in some examples, to suppress the hallucinated parts, a structural compliance probability score, $S_d$, is computed for each detection, d, using the equation:

$$S_d = \frac{1}{2}(P_{dc} + \pi(\beta_{max}, d)) \qquad \text{Eq. 2}$$

where $\pi(\beta_{max}, d)$ may be the maximum cluster affinity score computed in Eq. 1. In some examples, part detections having a significant structural compliance probability score may be retained while others are suppressed. For example, a significant structural compliance probability score may be any score above a predetermined threshold score.

As shown by arrow 216, blocks 208-214 may be performed for each part class. For example, a part class may be a head, neck, left shoulder, right shoulder, etc. In some examples, blocks 208-214 may be greedily and sequentially applied to each part class. In some examples, each part class may be processed in parallel. For example, all necks may be assigned to their respective heads in parallel. In some examples, the greedy sequential assignment may thus assign of all of the detected body parts to candidate person clusters to generate person clusters.

This process flow diagram is not intended to indicate that the blocks of the example process 200 are to be executed in any particular order, or that all of the blocks are to be included in every case. Further, any number of additional blocks not shown may be included within the example process 200, depending on the details of the specific implementation.

Figure 3B:
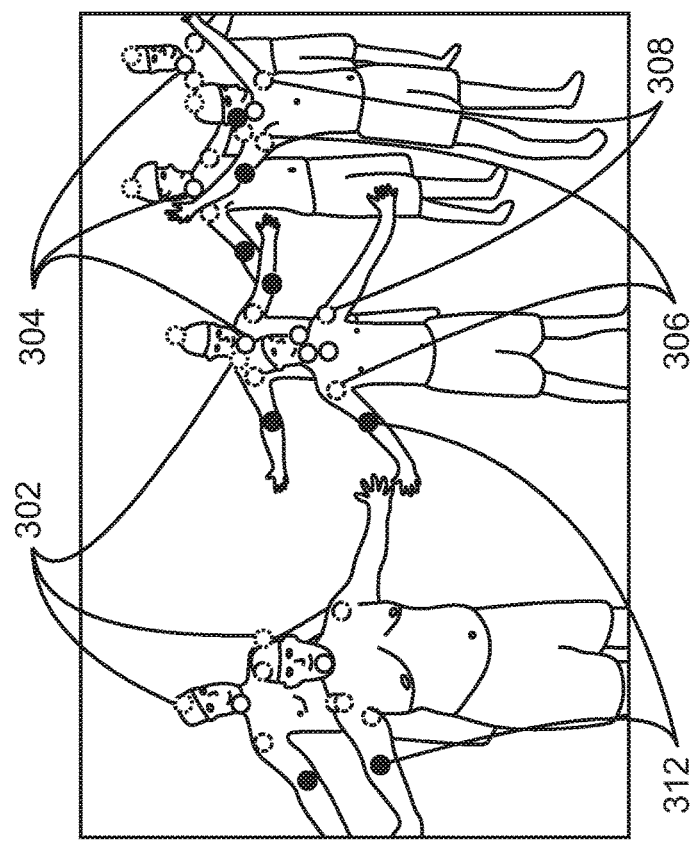
FIGS. 3A and 3B are diagrams illustrating an example part detection clustering.
Figure 3A:
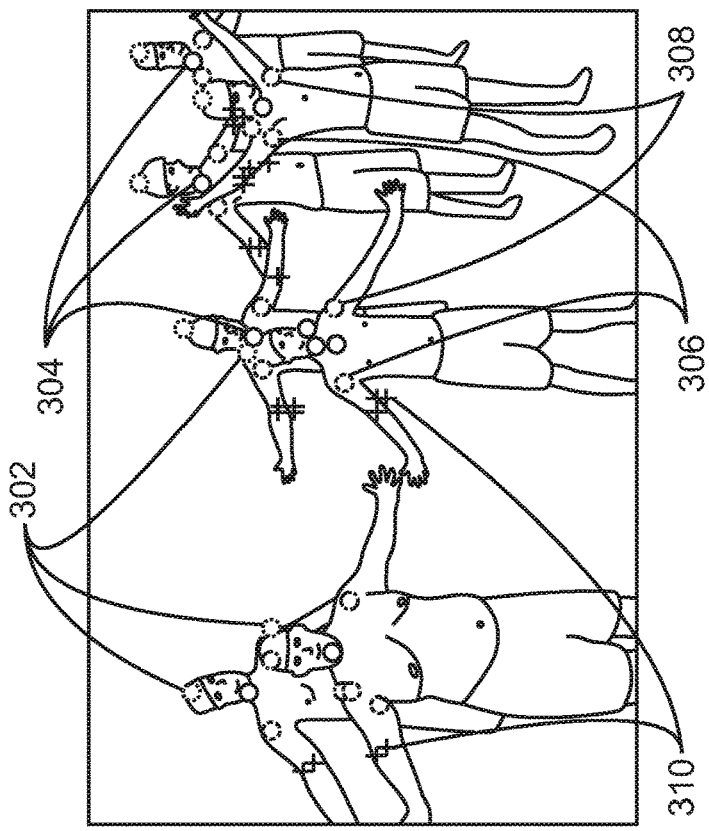

FIGS. 3A and 3B are a diagrams illustrating an example part detection clustering. The diagrams are generally referred to by the reference numbers 300A and 300B, and the example part detection clustering can be implemented in the computing device 900 described below. For example, the part detection clustering can be performed using the detection clusterer 938 of the computing device 900 of FIG. 9 described below, or the detection clusterer module 1012 of the computer readable media 1000 of FIG. 10 described below.

FIG. 3A includes head detections 302, neck detections 304, right shoulder detections 306, and left shoulder detections 308. FIG. 3A also includes part detections 310. FIG. 3B includes clustered part detections 312 shown by solid circles.

An illustration of part detection clustering is illustrated through the right elbow in FIGS. 3A and 3B. The initial part detections 310 are shown as '+'s in 300A. For example, the part detections 310 may have been received from a neural network. In some examples, the part detections 310 may also have been refined as discussed above. In the example of 300A, clustering may have already been performed on head detections 302, neck detections 304, right should detections 306, and left shoulder detections 308. As discussed above, clustering may include determining a cluster center for a plurality of detections associated with each body part type, determining a cluster center, and choosing a part detection closer to the cluster center as a clustered part detection to replace each cluster of detections. In 300A, part detections 310 may have not yet been clustered and replaced by a clustered part detection 312.

In the example of 300B, the clusters of part detections 310 may have been clustered and replaced by clustered right elbow part detections 312. The selected parts from the spatial clusters are in 300B. As seen in 300B, the clusters have been replaced by right elbow detections 312.

The diagram of FIGS. 3A and 3B are not intended to indicate that the example part detection clustering of diagrams 300A and 300B is to include all of the components shown in FIGS. 3A and 3B. Rather, the example part detection clustering of 300A and 300B can be implemented using fewer or additional components not illustrated in FIGS. 3A and 3B (e.g., additional part detection clusters, clustered part detections, part types, etc.).

FIGS. 4A and 4B are diagrams illustrating an example candidate person cluster selection. The diagrams are generally referred to by the reference numbers 400A and 400B, and the example candidate person cluster selection can be performed in the computing device 900 below. For example, the candidate person cluster selection 400 can be implemented using the candidate selector 938 of the computing device 900 of FIG. 9, or the candidate selector module 1014 of the computer readable media 1000 of FIG. 10 described below.

An illustration of candidate cluster selection for the right hip of the sixth person from the left is shown in FIGS. 4A and 4B. As shown in FIG. 4A, the distances of the hip from all heads may be computed. However, computing distances 404A for the hip 402 to every head may be resource intensive.

As shown in FIG. 4B, only five more proximal heads and their corresponding partial clusters are considered for hip 402 assignment. Thus, only five calculations for the computing distances 404B are performed rather than eleven as in 400A. As a hip 402 is likely to belong to a head that are proximal, computing resources may thus be saved while maintaining accuracy of assignment.

The diagram of FIG. 4 is not intended to indicate that the example candidate person cluster selection is to include all of the components shown in FIGS. 4A and 4B. Rather, the example candidate person cluster selection can be implemented using fewer or additional components not illustrated in FIGS. 4A and 4B (e.g., additional people, distances, number of proximal predecessors considered, etc.).

Figure 5:
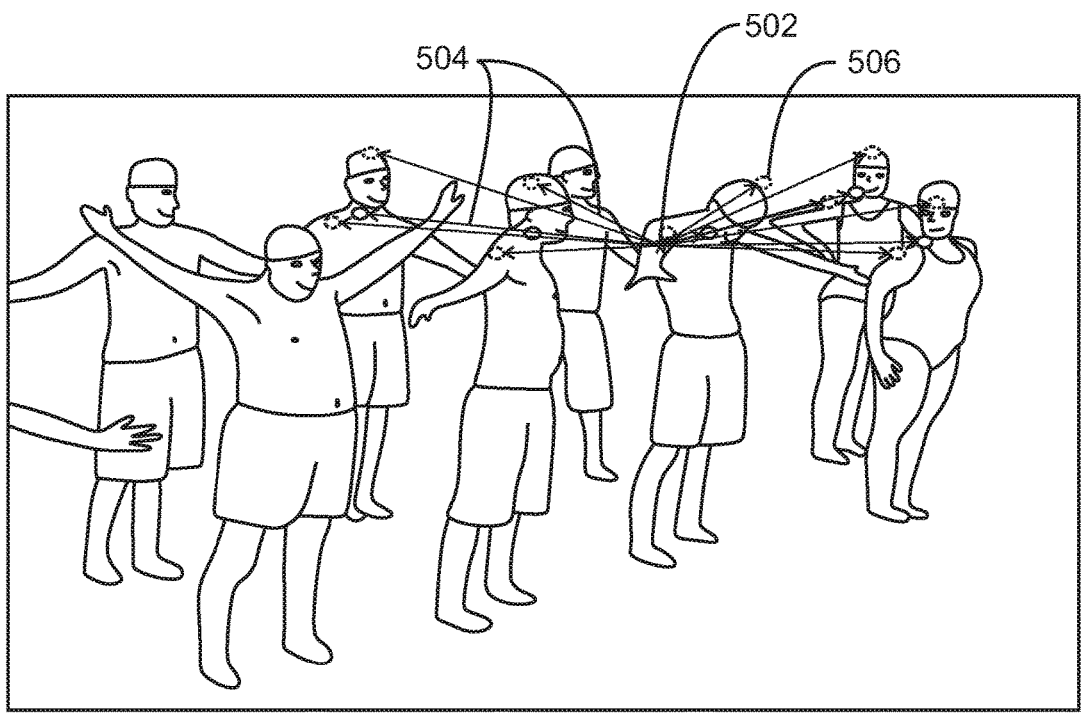
FIG. 5 is a diagram illustrating an example greedy sequential part assignment.

FIG. 5 is a diagram illustrating an example sequential part assignment. The example sequential part assignment is generally referred to by the reference number 500 and can be implemented in the computing device 900 described below. For example, the sequential part assignment 500 can be performed using the sequential assigner 940 of the computing device 900 of FIG. 9 below, or the sequential assigner module 1016 of the computer readable media 1000 of FIG. 10 below.

In some examples, the right elbow 502 of the sixth person from the left may be assigned using the pairwise probabilities 504 between the right elbow 502 and its pre-detected predecessor parts of head, right shoulder and neck, of five proximal part detections for each predecessor, as shown in the table below:

| Part | Predecessor(s) |
|---|---|
| Neck | Head |
| Right Shoulder | Head, Neck |
| Left Shoulder | Head, Neck |
| Right Elbow | Head, Neck, Right Shoulder |
| Right Wrist | Head, Neck, Right Shoulder, Right Elbow |
| Left Elbow | Head, Neck, Left Shoulder |
| Left Wrist | Head, Neck, Left Shoulder, Left Elbow |
| Right Hip | Head, Neck, Left Shoulder, Right Shoulder |
| Right Knee | Head, Neck, Right Shoulder, Left Shoulder, Right Hip |
| Left Hip | Head, Neck, Right Shoulder, Left Shoulder |
| Left Knee | Head, Neck, Right Shoulder, Left Shoulder, Left Hip |
| Right Ankle | Right Hip, Right Knee |
| Left Ankle | Left Hip, Left Knee |

In some examples, the right elbow 502 may be assigned to the person cluster including the more proximal head 506. In some examples, the proximity to each of the predecessors may be averaged to determine which person cluster to assign the right elbow 502 part detection as discussed above.

The diagram of FIG. 5 is not intended to indicate that the example sequential part assignment 500 is to include all of the components shown in FIG. 5. Rather, the example sequential part assignment 500 can be implemented using fewer or additional components not illustrated in FIG. 5 (e.g., additional people, parts, predecessors, pairwise probabilities, etc.).

Figure 6A:
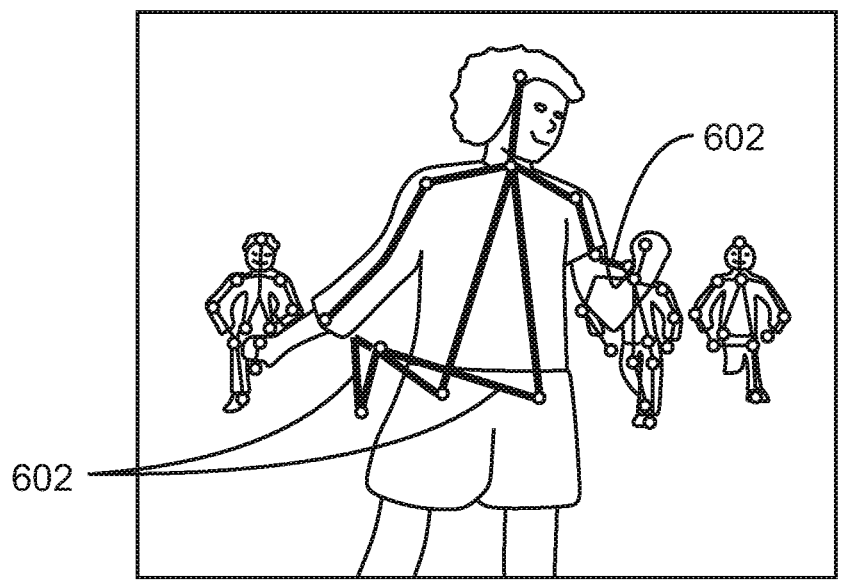
FIGS. 6A and 6B are diagrams illustrating an example suppression of hallucinated parts.
Figure 6B:
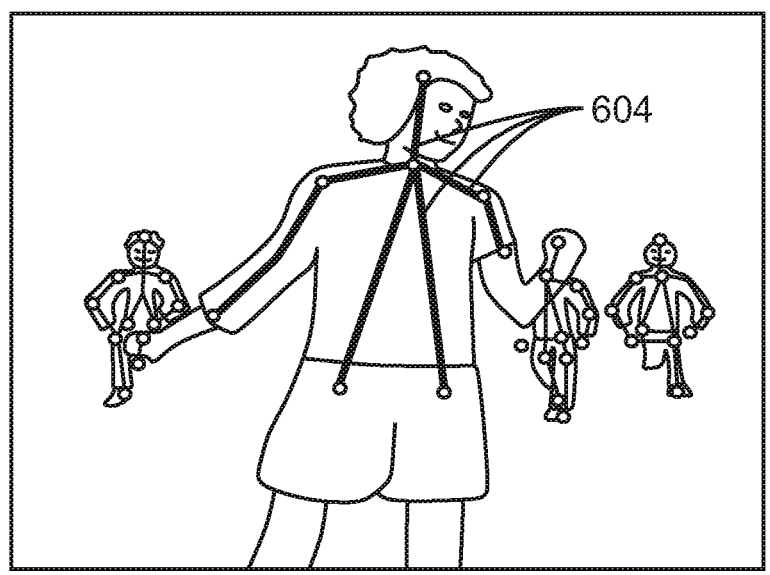

FIGS. 6A and 6B are diagrams illustrating an example suppression of hallucinated parts. The diagrams are generally referred to by the reference numbers 600A and 600B and the suppression of hallucinated parts can be implemented in the computing device 900 below. For example, the sequential part assignment 600 can be performed using the hallucination suppressor 942 of the computing device 900 of FIG. 9 below, or the hallucination suppressor module 1018 of the computer readable media 1000 of FIG. 10 below.

As shown in 600A, one or more hallucinated parts 602 may be detected in part detections received from a neural network. For example, the hallucinated parts 602 may have been detected as part detections due to background objects appearing similar to body parts or due to occlusions of body parts resulting in forced false part detections. Thus, the hallucinated parts may not represent any actual body parts. In some examples, the part detections may have been refined and clustered as describe above. The detected hallucinated parts 602 may then be detected and removed according to techniques described above. For example, the parts may be detected using structural compliance probability score calculated using Eq. 1.

As shown in 600B, the resulting person cluster 604 shows the hallucinated parts 602 no longer included. Thus, the accuracy of pose estimation may be increased by removing the hallucinated parts 602.

The diagram of FIG. 6 is not intended to indicate that the example sequential part assignment 600 is to include all of the components shown in FIG. 6. Rather, the example sequential part assignment 600 can be implemented using fewer or additional components not illustrated in FIG. 6 (e.g., additional people, person clusters, hallucinated parts, part detections, etc.).

Figure 7A:
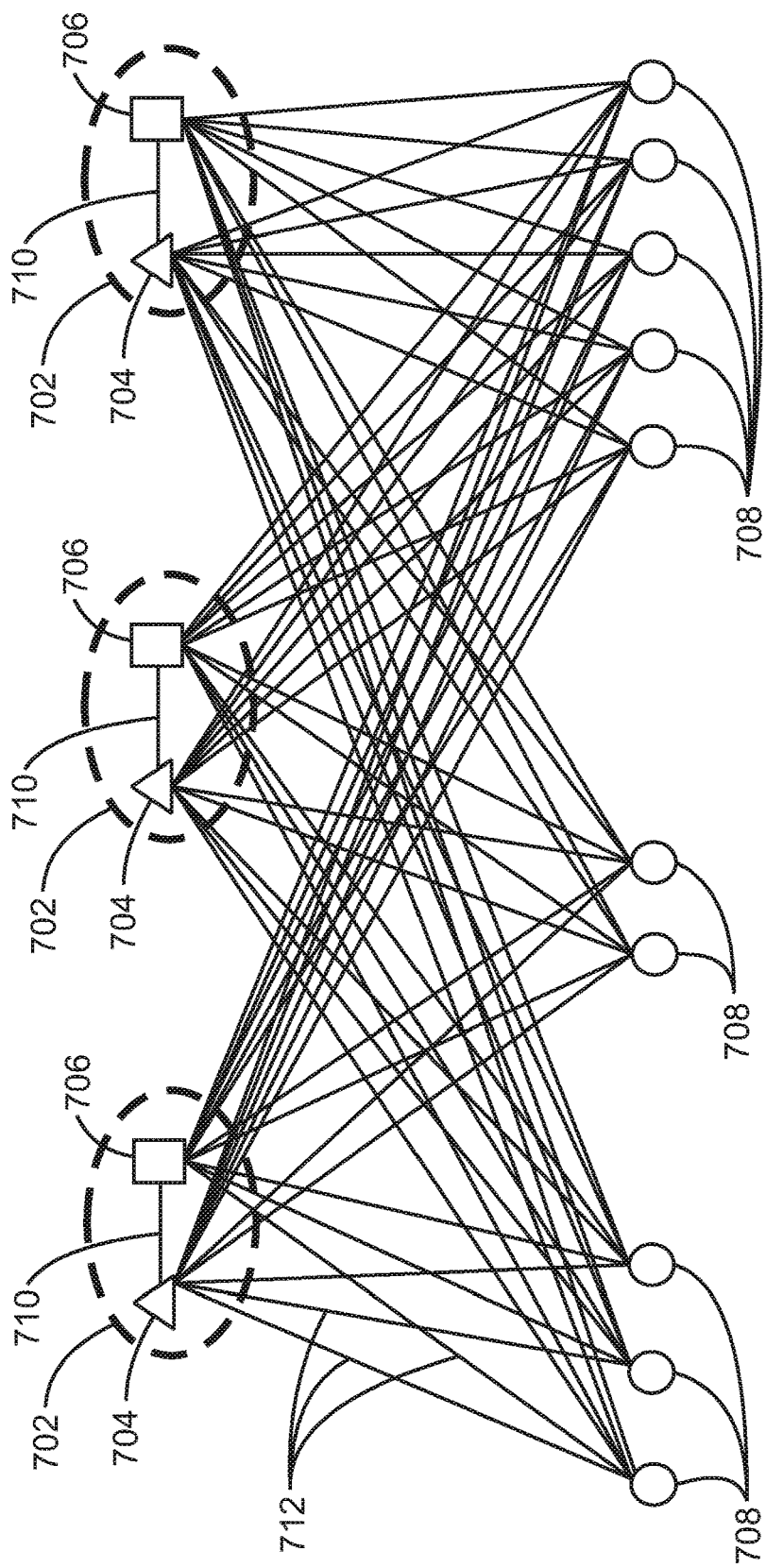
FIG. 7A is a diagram illustrating an example initial part assignment of body part candidates corresponding to right shoulders to three person clusters.

FIG. 7A is a diagram illustrating an example initial part assignment of body part candidates corresponding to right shoulders to three person clusters. The example initial part assignment is generally referenced using the reference number 700A and can be generated using the detection clusterer 936 of computing device 900 or the detection clusterer module 1012 of computer readable media 1000 of FIG. 10 below.

The initial part assignment of body part candidates 700A includes three partial person clusters 702 including a head 704 and a neck 706. The initial part assignment of body part candidates 700A includes a plurality of part candidates 708. The necks 706 may have already been assigned to the heads 704 as indicated by connections 710. In addition, the initial body part assignment 700A includes a plurality of initial connections 712 for the plurality of body part candidates 708.

In some examples, a set of confidence maps for each body part class and a set of part-association maps may have been computed using an a priori modelled set of deep neural networks (DNNs). For example, a part confidence map may provide the probability of occurrence of the corresponding part class at every pixel location. An association map may provide the probability of co-occurrence for every pair of body part candidates, in the same person. In some examples, a set of body part candidates, $D_j$ of each part class j may be obtained by the non-maximal suppression of the confidence map of part j, where $D_j=\{d_j^i:j\in\{1, 2, \ldots J\}$ and i e $\{1, 2 \ldots N_j\}\}$, where $N_j$ is the number of body part candidates of part class j, d represents the $i^{th}$ body part candidate of the $j^{th}$ part class and J=14, is the total number of part classes. Let $P_{ij}$ denote the unary probability of $d_j^i$ while $P_{ljmk}$ denote the co-occurrence probability of $d_j^l$ and $d_m^k$ in the same person.

In some examples, a multi-person pose estimation problem can thus be viewed as retaining a subset of all body part candidates from all part classes and assigning each part to one of the $N_H$ person clusters, $\beta=\{\beta_h:h\in\{1, 2, N_H\}\}$, while satisfying the constraint that not more than one part of any part class is assigned to the same person cluster. For example, the problem may be visualized as a J-Partite graph in which the nodes represent the body part candidates and the edge-weights reflect the pairwise association probabilities. In some examples, there may be a total of $N_D$ nodes in the graph, where $N_D=\Sigma_{j=1}^{J} N_j$. A solution to the part-assignment problem may include partitioning this graph into $N_H$ disjoint subgraphs, such that each subgraph represents a person cluster. For example, such a solution can be represented using a set of indicator variables $Z_{i,j,h}\in(0,1)$ that capture the assignment of the $i^{th}$ body part candidate of the $j^{th}$ part class to the $h^{th}$ person cluster. $N_H$ may be unknown in the considered image. The method may thus begin by estimating $N_H$ from the number of significant head detections. Each head location may initialize a person cluster 702. In some examples, at this stage, $Z_{i,j,h}=1$ for all permissible combinations of i, j and h. The body parts may then be assigned to these person clusters 702 greedily, considering one part class at a time, moving sequentially down the kinematic chain from neck to ankle. As shown in FIG. 7A, necks 704 may have already been assigned to heads 702.

The diagram of FIG. 7A is not intended to indicate that the example initial body part assignment 700A is to include all of the components shown in FIG. 7A. Rather, the example initial body part assignment 700A can be implemented using fewer or additional components not illustrated in FIG. 7A (e.g., body part candidates, additional partial person clusters, part types, etc.).

Figure 7B:
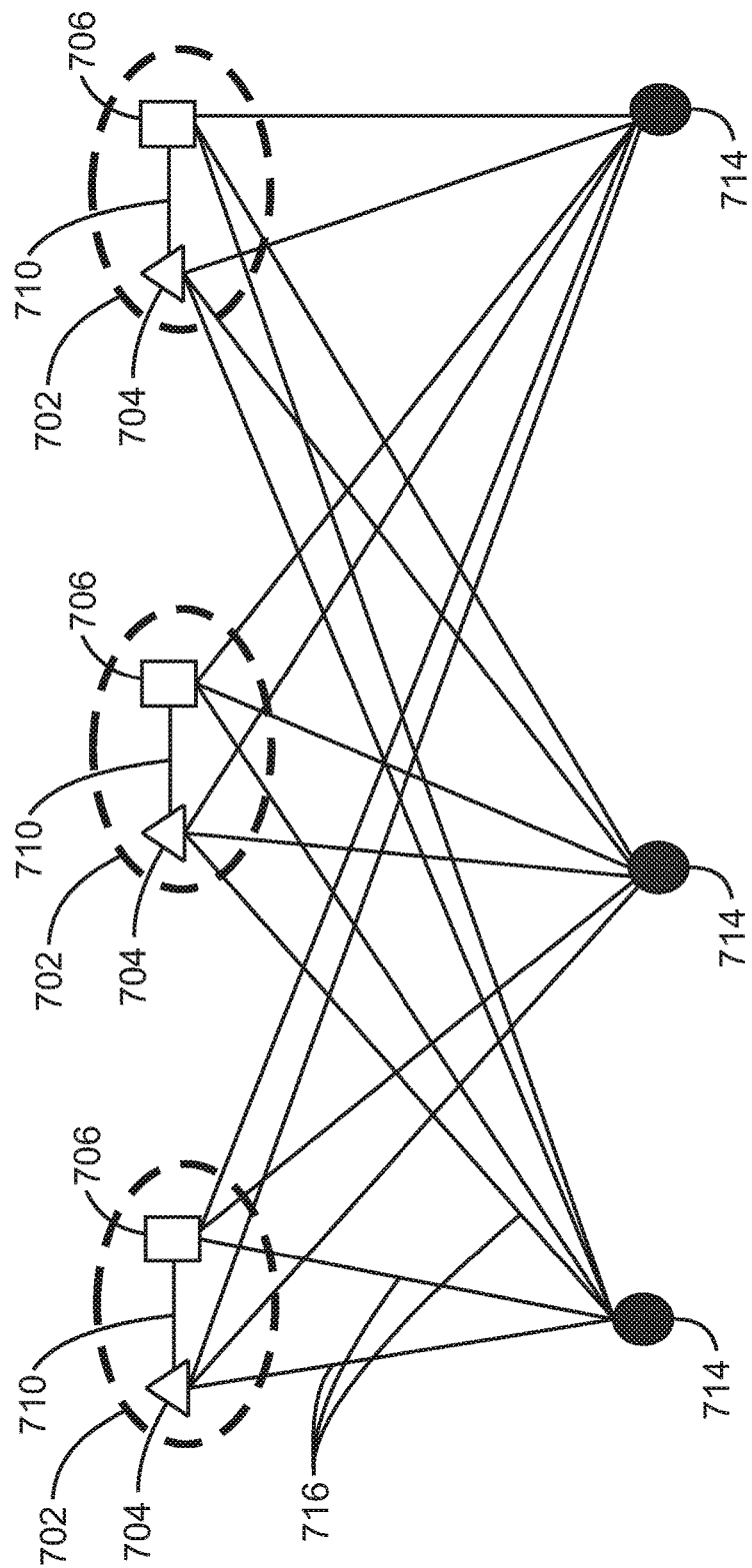
FIG. 7B is a diagram illustrating an example clustering of body part candidates.

FIG. 7B is a diagram illustrating an example clustering of body part candidates. The example clustering of body part candidates is generally referenced using the reference number 700B and can be generated using the detection clusterer 936 of computing device 900 or the detection clusterer module 1012 of computer readable media 1000 of FIG. 10 below.

The clustering of body part candidates 700B of FIG. 7B includes similar elements from FIG. 7A as indicated by similar reference numbers. The clustering 700B further includes part cluster centers 714 corresponding to right shoulders. The part cluster centers 714 are shown connected to each of the heads 704 and necks 706 via connections 716.

In some examples, a body part class candidate-set $D_1$ may be first spatially clustered to $N_H$ clusters through K-means clustering with 100 iterations. For example, such spatial clustering may have a complexity of $O(N_H N_j)$. As a result of the spatial clustering, $C_j=\{d_j^c:c\in\{1, 2, \ldots N_H\}\}$ part cluster centers 714 may be obtained. For example, the part cluster centers 714 may denote the final body parts of the part class j, or right shoulders in the example of FIG. 7B. Mathematically, the body part candidate clustering $Z_{i,j,h}$ may set a subset of indicator variables to zero as shown in the equation below:

$$Z_{i,j,h} = \begin{cases} 1 & d_j^i \in C_j \\ 0 & \text{otherwise} \end{cases} \qquad \text{Eq. 3}$$

The diagram of FIG. 7B is not intended to indicate that the example clustering of body part candidates 700B is to include all of the components shown in FIG. 7B. Rather, the example clustering of body part candidates 700B can be implemented using fewer or additional components not illustrated in FIG. 7B (e.g., part candidate clusters, additional partial person clusters, part types, etc.).

Figure 7C:
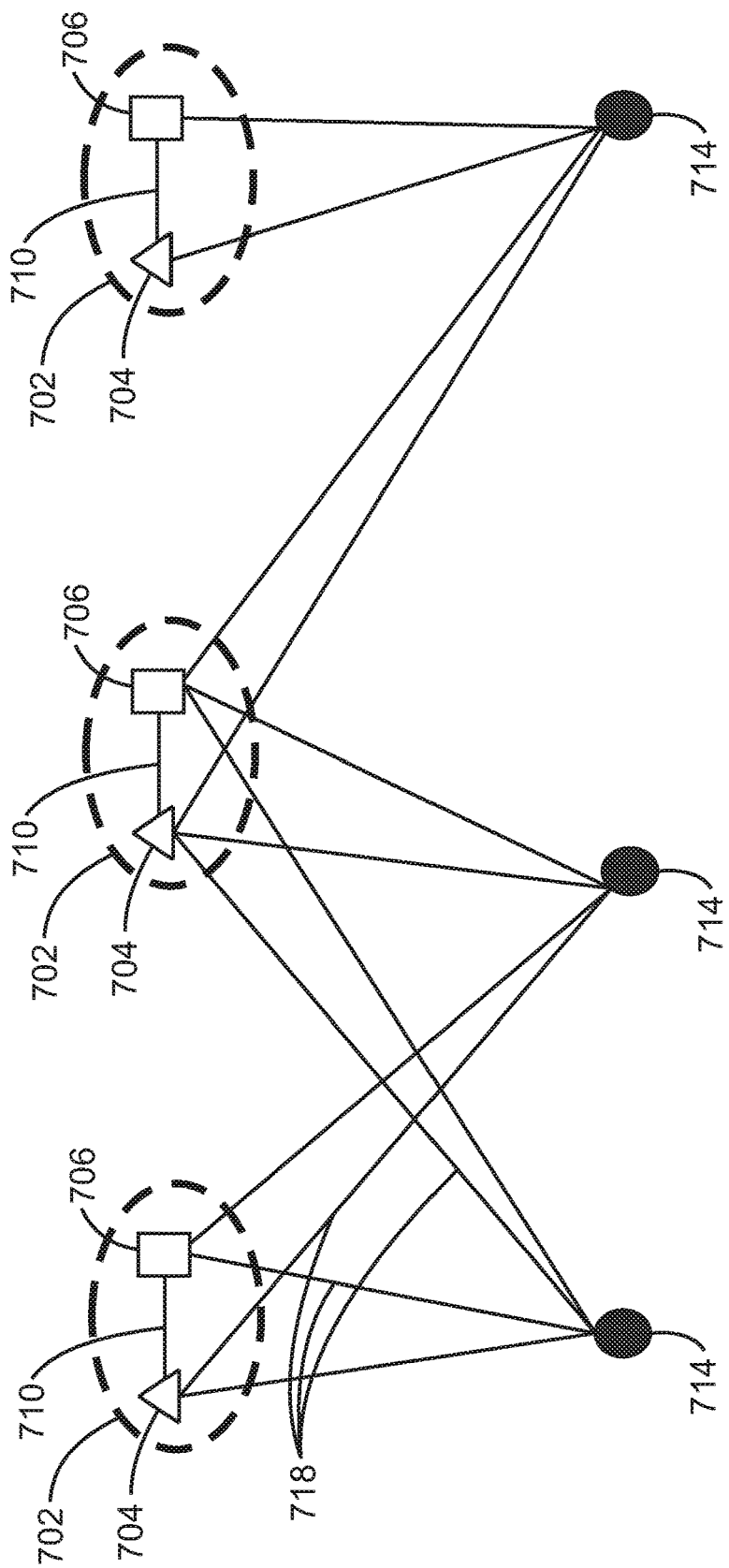
FIG. 7C is a diagram illustrating an example proximal candidate clustering.

FIG. 7C is a diagram illustrating an example proximal candidate clustering. The example proximal candidate clustering is generally referenced using the reference number 700C and can be generated using the candidate selector 938 of computing device 900 or the candidate selector module 1014 of computer readable media 1000 of FIG. 10 below.

The proximal candidate clustering 700C of FIG. 7C includes similar elements from FIGS. 7A and 7B, as indicated by similar reference numbers. The proximal candidate clustering 700C further includes proximal connections 718. For example, the proximal connections 718 may be a subset of the connections 716 of FIG. 7B.

As shown in FIG. 7B, a subset of predecessor parts 704 and 706 may be selected to improve performance. As part assignment moves down the kinematic chain, the number of prior assigned parts, T, in each partial person cluster may increase progressively. In some examples, a subset of L parts may be used as predecessors while assigning the current part in order to keep complexity constant. For example, in images with large number of people (a large $N_H$), the complexity of part-assignment may be high. In order to reduce the complexity of the part assignment, a subset of M most proximal person clusters may be considered for part assignment. In some examples, human anthropometric data and a scale of the image may be used to compute M adaptively. Thus, the complexity of body part assignment discussed in FIG. 7D below may be reduced to $O(MN_H L)$. Moreover, the overall complexity of the proposed algorithm may be reduced to $O(N_H N_J) + O(MN_H L)$. In addition, since the number of body part candidates, $N_j$ is much larger than any other parameter, the complexity may be linear with the maximum number of body part candidates belonging to any part class. Thus, the $O(N_1)$ complexity of part assignment using proximal connection may be very much lower than that of other graph-based approaches.

As shown in FIG. 7C, the complexity reduction achieved is shown through the visualization of the body-parts relationship graph. For example, during the assignment of the right shoulder candidates (j=3) to a set of $N_H$=3, partial person clusters, the clustering of body part candidates in FIG. 7B and the limiting of predecessor parts considered progressively sparisifies the graph. This sparsity reduces the complexity and hence speeds up the multi-person part assignment problem. Thus, a processor may more efficiently assign body parts belonging to many people as described in FIG. 7D below.

The diagram of FIG. 7C is not intended to indicate that the example proximal candidate clustering 700C is to include all of the components shown in FIG. 7C. Rather, the example proximal candidate clustering 700C can be implemented using fewer or additional components not illustrated in FIG. 7C (e.g., proximal candidate clusters, additional partial person clusters, part types, etc.).

Figure 7D:
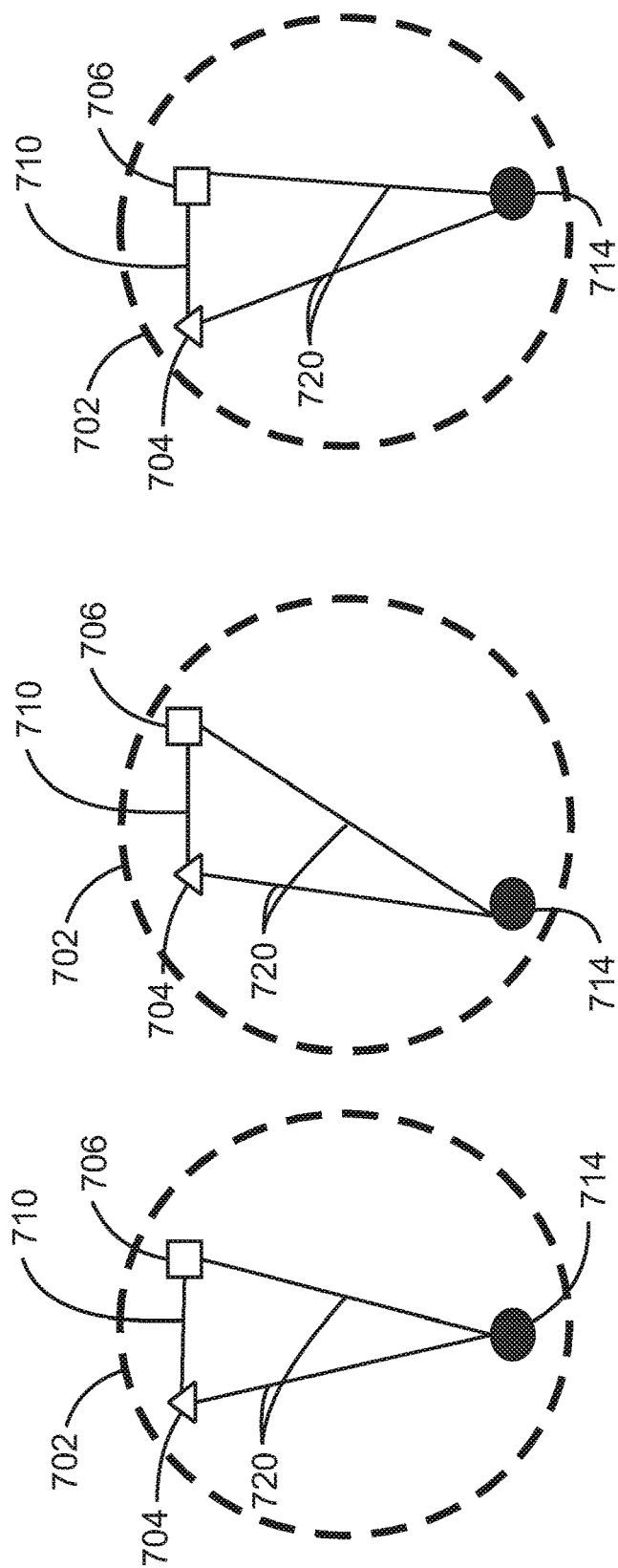
FIG. 7D are diagrams illustrating an example partial person clusters including right shoulders.

FIG. 7D are diagrams illustrating example partial person clusters including right shoulders. The example partial person clusters are generally referenced using the reference number 700D and can be generated using the sequential assigner 938 of computing device 900 or the sequential assigner module 1016 of computer readable media 1000 of FIG. 10 below.

The partial person clusters 700D of FIG. 7D include similar elements from FIGS. 7A, 7B, and 7C, as indicated by similar reference numbers. The partial person clusters 700D further include final assignments 720 for each of the part cluster centers 714. In some examples, each of the part cluster centers, or body parts $d_j^c$, may be assigned to a partial person cluster, h, which has a higher cluster affinity score with that part. The cluster affinity score, $\pi_{c,j,h}$ between a part, $d_j^c$ and a person cluster, $\beta_h$, may be computed as the average pairwise probability of $d_j^c$ with the T prior assigned parts of h. In some examples, since $|C_j|=N_H$ and $|\beta|=N_H$, this step may incur a complexity of $O(TN_H^2)$. As a result of a part-assignment step another major set of indicator variables may be set to zero using the equation below:

$$Z_{i,j,h} = \begin{cases} 1 & d_j^i \in C_j \text{ and } h = \operatorname{argmax}_t(\pi_{c,j,t}) \\ 0 & \text{otherwise} \end{cases} \quad \text{Eq. 4}$$

The diagram of FIG. 7D is not intended to indicate that the example partial person clusters 700D are to include all of the components shown in FIG. 7D. Rather, the example partial person clusters 700D can be implemented using fewer or additional components not illustrated in FIG. 7D (e.g., additional partial person clusters, part types, etc.).

Figure 8:
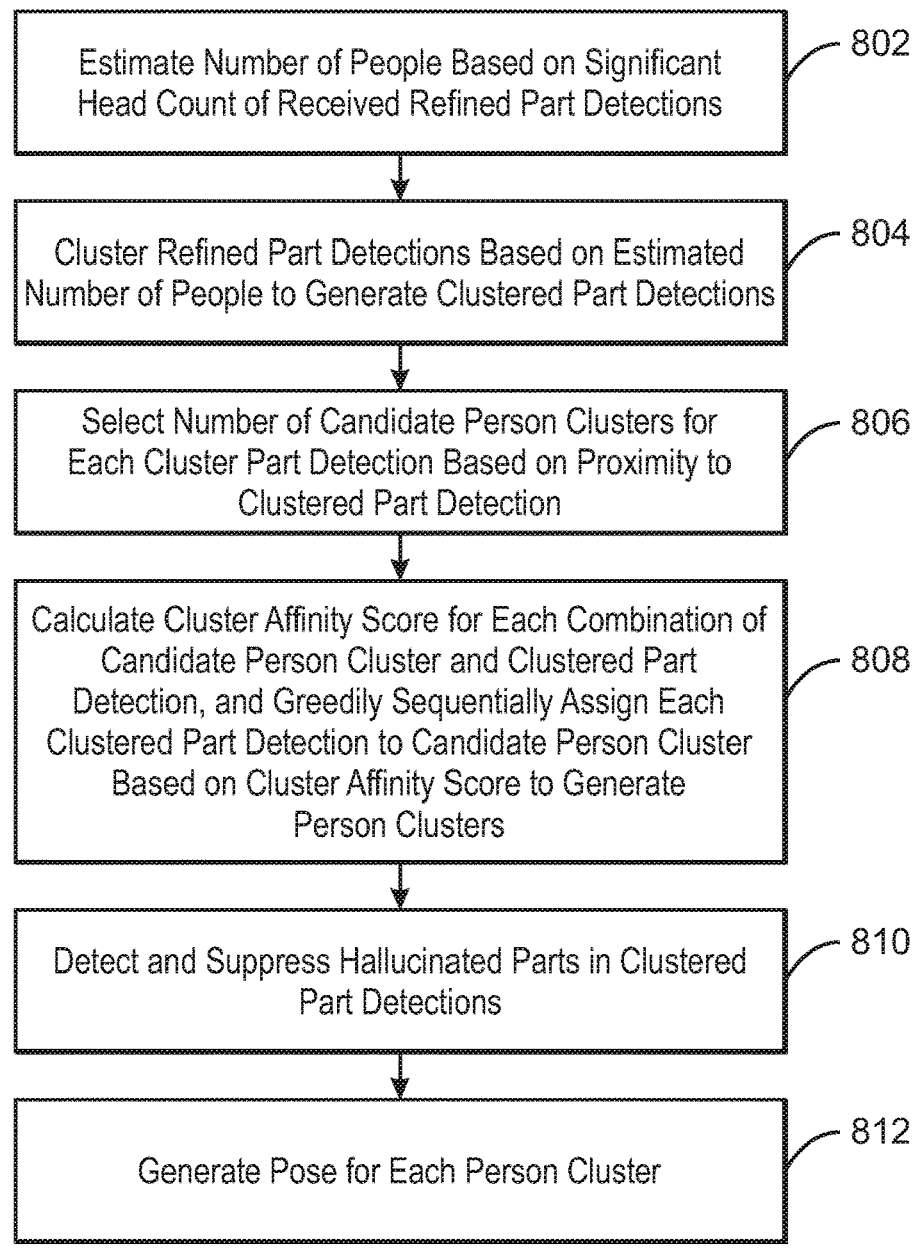
FIG. 8 is a flow chart illustrating an example method for estimating multi-person poses.

FIG. 8 is a flow chart illustrating an example method for estimating multi-person poses. The example method is generally referred to by the reference number 800 and can be implemented in the computer device 900 of FIG. 9 described below, the processor 902 of the computing device 900 of FIG. 9 described below, or the computer readable media 1000 of FIG. 10 described below.

At block 802, the processor estimates a number of people based on a significant head count of received refined part detections. For example, the processor can estimate the number of persons in a scene to reduce the complexity of multi-person pose estimation. In some examples, the processor may receive body part candidates from an imaging device. In some examples, the detected body part candidates may be received from a neural network, such as a CNN or a DNN. In some examples, the body part candidates may have been refined to generate refined part detections. For example, the processor can refine the body part candidates based on non-maximal suppression, location refinement of detections, unary probability thresholding, or any combination thereof. For example, the processor may refine body part candidates according to the techniques described in FIG. 2 above.

At block 804, the processor clusters the refined part detections based on the estimated number of people to generate clustered part detections. For example, the processor may performing a spatial k-means clustering. In some examples, the processor may cluster part detections according to the examples of FIGS. 2, 3A, and 3B above.

At block 806, the processor selects a number of candidate person clusters for each clustered part detection based on proximity to the clustered part detection. For example, the processor can limit the body part candidates approximately to the estimated number of people through a K-means clustering.

At block 808, the processor calculates a cluster affinity score for each combination of candidate person cluster and clustered part detection, and greedily sequentially assigns each clustered part detection to a candidate person cluster based on the cluster affinity score to generate person clusters. For example, the processor can calculate co-occurrence probabilities for the combinations. In some examples, the processor can greedily and sequentially assign the clustered part detections by type of body part from head down.

At block 810, the processor detects and suppresses hallucinated parts in the clustered part detections. For example, the processor may detected and suppress hallucinated parts according to the examples of FIGS. 2, 6A, and 6B above.

At block 812, the processor generates a pose for each person cluster. For example, the processor may display the generate poses as an overlay on a display. In some examples, the generated poses may be generated in real time. Thus, in some examples, the generated poses may also be used for any suitable application, such as action recognition and human object interaction applications.

This process flow diagram is not intended to indicate that the blocks of the example process 800 are to be executed in any particular order, or that all of the blocks are to be included in every case. Further, any number of additional blocks not shown may be included within the example process 800, depending on the details of the specific implementation.

Figure 9:
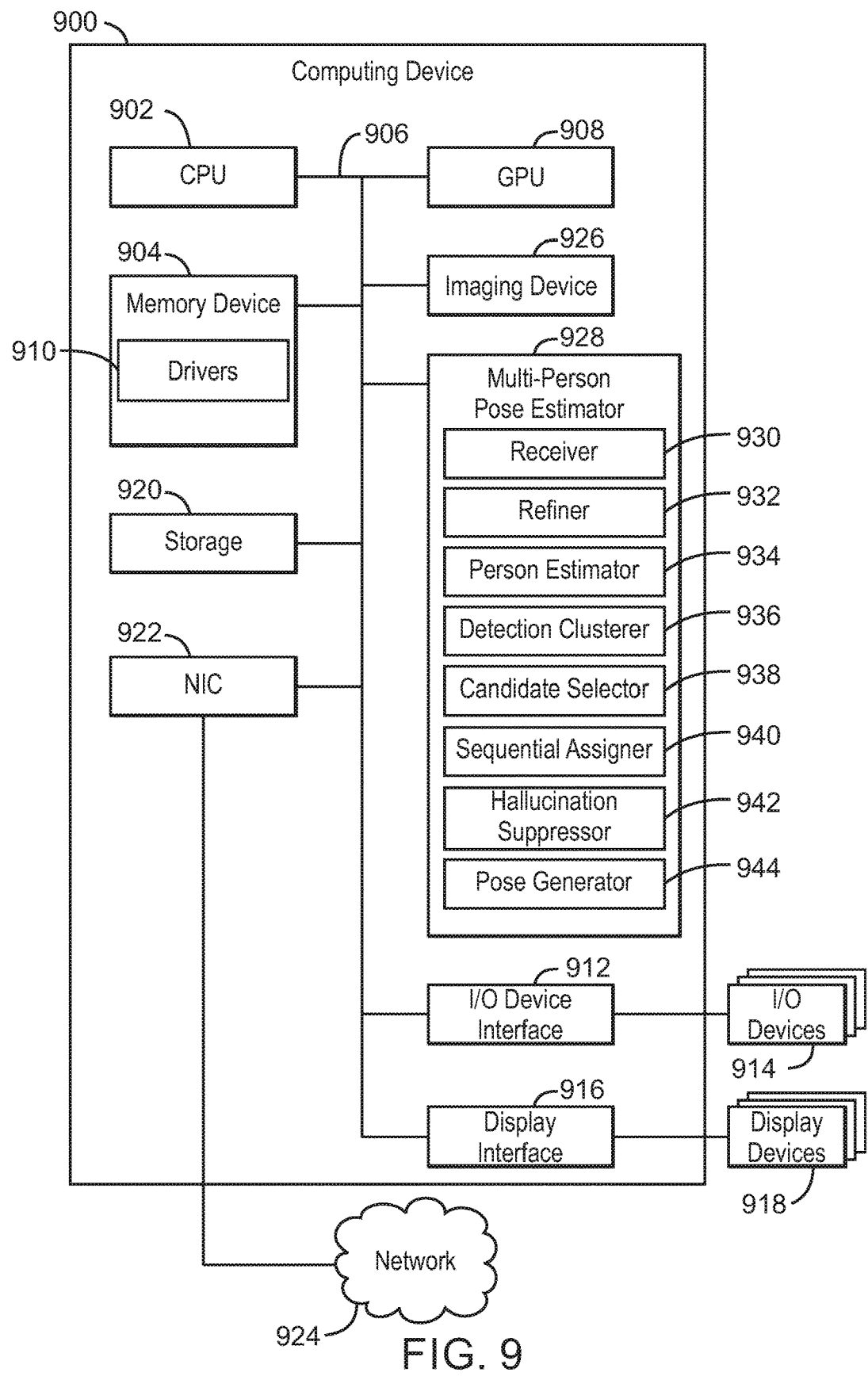
FIG. 9 is block diagram illustrating an example computing device that can estimate multi-person poses.

Referring now to FIG. 9, a block diagram is shown illustrating an example computing device that can estimate multi-person poses. The computing device 900 may be, for example, a laptop computer, desktop computer, tablet computer, mobile device, or wearable device, among others. In some examples, the computing device 900 may be a smart camera or a digital security surveillance camera. The computing device 900 may include a central processing unit (CPU) 902 that is configured to execute stored instructions, as well as a memory device 904 that stores instructions that are executable by the CPU 902. The CPU 902 may be coupled to the memory device 904 by a bus 906. Additionally, the CPU 902 can be a single core processor, a multi-core processor, a computing cluster, or any number of other configurations. Furthermore, the computing device 900 may include more than one CPU 902. In some examples, the CPU 902 may be a system-on-chip (SoC) with a multi-core processor architecture. In some examples, the CPU 902 can be a specialized digital signal processor (DSP) used for image processing. The memory device 904 can include random access memory (RAM), read only memory (ROM), flash memory, or any other suitable memory systems. For example, the memory device 904 may include dynamic random access memory (DRAM).

The memory device 904 can include random access memory (RAM), read only memory (ROM), flash memory, or any other suitable memory systems. For example, the memory device 904 may include dynamic random access memory (DRAM). The memory device 904 may include device drivers 910 that are configured to execute the instructions for device discovery. The device drivers 910 may be software, an application program, application code, or the like.

The computing device 900 may also include a graphics processing unit (GPU) 908. As shown, the CPU 902 may be coupled through the bus 906 to the GPU 908. The GPU 908 may be configured to perform any number of graphics operations within the computing device 900. For example, the GPU 908 may be configured to render or manipulate graphics images, graphics frames, videos, or the like, to be displayed to a user of the computing device 900.

The memory device 904 can include random access memory (RAM), read only memory (ROM), flash memory, or any other suitable memory systems. For example, the memory device 904 may include dynamic random access memory (DRAM). The memory device 904 may include device drivers 910 that are configured to execute the instructions for generating virtual input devices. The device drivers 910 may be software, an application program, application code, or the like.

The CPU 902 may also be connected through the bus 906 to an input/output (I/O) device interface 912 configured to connect the computing device 900 to one or more I/O devices 914. The I/O devices 914 may include, for example, a keyboard and a pointing device, wherein the pointing device may include a touchpad or a touchscreen, among others. The I/O devices 914 may be built-in components of the computing device 900, or may be devices that are externally connected to the computing device 900. In some examples, the memory 904 may be communicatively coupled to I/O devices 914 through direct memory access (DMA).

The CPU 902 may also be linked through the bus 906 to a display interface 916 configured to connect the computing device 900 to a display device 918. The display device 918 may include a display screen that is a built-in component of the computing device 900. The display device 918 may also include a computer monitor, television, or projector, among others, that is internal to or externally connected to the computing device 900.

The computing device 900 also includes a storage device 920. The storage device 920 is a physical memory such as a hard drive, an optical drive, a thumbdrive, an array of drives, a solid-state drive, or any combinations thereof. The storage device 920 may also include remote storage drives.

The computing device 900 may also include a network interface controller (NIC) 922. The NIC 922 may be configured to connect the computing device 900 through the bus 906 to a network 924. The network 924 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 900 further includes an imaging device 926. For example, the imaging device 926 may include one or more depth sensors. In some example, the imaging device 926 may include a processor to generate depth information. For example, the imaging device 926 may include functionality such as RealSense™ technology.

The computing device 900 further includes a multi-person estimator 928. For example, the multi-person estimator 928 can be used to estimate multi-person poses. The multi-person estimator 928 can include a receiver 930, a refiner 932, a person estimator 934, a detection clusterer 936, a candidate selector 938, a sequential assigner 940, a hallucination suppressor 942, and a pose generator 944. In some examples, each of the components 930-944 of the multi-person estimator 928 may be a microcontroller, embedded processor, or software module. The receiver 930 can receive body part candidates. For example, the receiver 930 can receive the body part candidates from a neural network. In some examples, the neural network may be a convolutional neural network trained to detect the body part candidates. In some examples, the receiver 930 can receive refined part detections. The refiner 932 can refine the body part candidates to generate refined part detections. For example, the refiner 932 can refine received body part candidates based on non-maximal suppression, location refinement of detections, unary probability thresholding, or any combination thereof. The person estimator 934 can estimate a number of people based on a significant head count of the refined part detections. For example, the significant head count is based on a unary probability for each detected head exceeding a threshold probability. The detection clusterer 936 can cluster the refined part detections based on the estimated number of people to generate clustered part detections. For example, the detection clusterer 936 can cluster the refined part detections based on a spatial k-means clustering. In some examples, a refined part detection that is closer to a center of a generated spatial cluster may be selected as a clustered part detection. The candidate selector 938 can select a number of candidate person clusters for each clustered part detection based on proximity to the clustered part detection. The sequential assigner 940 can calculate a cluster affinity score for each combination of candidate person cluster and clustered part detection. For example, the sequential assigner 940 can calculate the cluster affinity score for each combination based on a received pairwise probability between the clustered part detection and one or more predecessor parts of the candidate person cluster. In some examples, the sequential assigner 940 can calculate the cluster affinity score for each combination based on a received pairwise probability between the clustered part detection and one or more predecessor parts on a same side of the candidate person cluster. The sequential assigner 940 can then greedily and sequentially assign each clustered part detection to a candidate person cluster based on the cluster affinity score to generate person clusters. The hallucination suppressor 942 can detect and suppress hallucinated parts in the clustered part detections, wherein clustered part detections having a structural compliance probability score below a threshold score are to be detected as hallucinated parts. The pose generator 944 can generate a pose for each person cluster. For example, the generated poses can be displayed as an overlay in an image or video. In some examples, the pose generator 944 can generate the poses in real time.

The block diagram of FIG. 9 is not intended to indicate that the computing device 900 is to include all of the components shown in FIG. 9. Rather, the computing device 900 can include fewer or additional components not illustrated in FIG. 9, such as additional buffers, additional processors, and the like. For example, the multi-person pose estimator 928 may receive refined part detections at the receiver 930 and thus not perform any refinement or include the refiner 932. The computing device 900 may include any number of additional components not shown in FIG. 9, depending on the details of the specific implementation. Furthermore, any of the functionalities of the CPU 902 may be partially, or entirely, implemented in hardware and/or in a processor.

Figure 10:
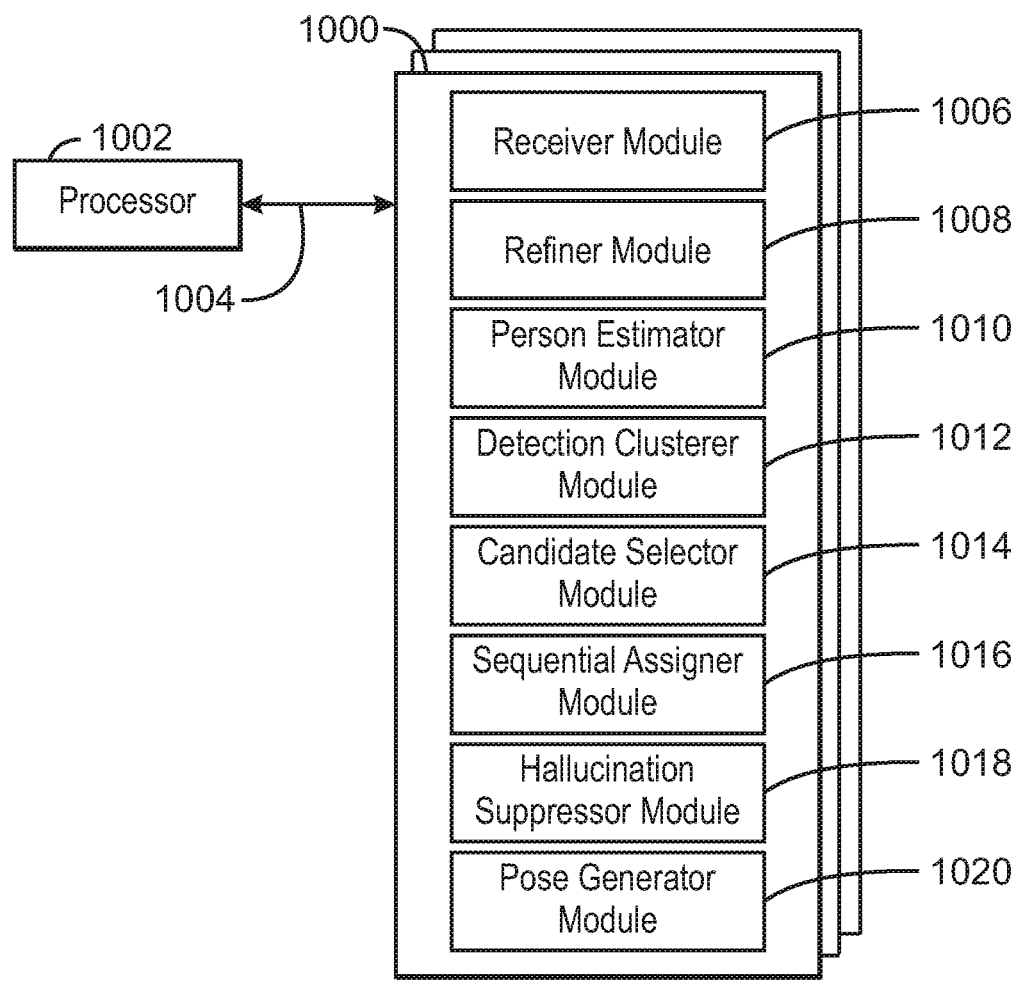
FIG. 10 is a block diagram showing computer readable media that store code for estimating multi-person poses.

FIG. 10 is a block diagram showing computer readable media 1000 that store code for estimating multi-person poses. The computer readable media 1000 may be accessed by a processor 1002 over a computer bus 1004. Furthermore, the computer readable medium 1000 may include code configured to direct the processor 1002 to perform the methods described herein. In some embodiments, the computer readable media 1000 may be non-transitory computer readable media. In some examples, the computer readable media 1000 may be storage media.

The various software components discussed herein may be stored on one or more computer readable media 1000, as indicated in FIG. 10. For example, a receiver module 1006 may be configured to receive body part candidates. In some examples, a refiner module 1008 may be configured to refine the body part candidates to generate refined part detections. For example, the refiner module 1008 may be configured to refine received body part candidates based on non-maximal suppression, location refinement of detections, unary probability thresholding, or any combination thereof. In some examples, the receiver module 1006 may receive refined part detections. A person estimator module 1010 may be configured to estimate a number of people based on a significant head count of the received refined part detections. For example, the person estimator module 1010 may be configured to detect a significant head based on a unary probability for a detected head exceeding a threshold probability. A detection clusterer module 1012 may be configured to cluster the refined part detections based on the estimated number of people to generate clustered part detections. For example, the detection clusterer module 1012 may be configured to cluster the refined part detections based on a spatial k-means clustering. A candidate selector module 1014 may be configured to select a number of candidate person clusters for each clustered part detection based on proximity to the clustered part detection. A sequential assigner module 1016 may be configured to calculate a cluster affinity score for each combination of candidate person cluster and clustered part detection and greedily sequentially assign each clustered part detection to a candidate person cluster based on the cluster affinity score to generate person clusters. A hallucination suppressor module 1018 may be configured to detect and suppress hallucinated parts based on a structural compliance probability score. A pose generator module 1020 may be configured to generate a pose for each person cluster.

The block diagram of FIG. 10 is not intended to indicate that the computer readable media 1000 is to include all of the components shown in FIG. 10. Further, the computer readable media 1000 may include any number of additional components not shown in FIG. 10, depending on the details of the specific implementation.

EXAMPLES

Example 1 is an apparatus for estimating poses. The apparatus includes a person estimator to estimate a number of people based on a significant head count of a plurality of received refined part detections. The apparatus also includes a detection clusterer to cluster the refined part detections based on the estimated number of people to generate clustered part detections. The apparatus further includes a candidate selector to select a number of candidate person clusters for each clustered part detection based on proximity to the clustered part detection. The apparatus also further includes a sequential assigner to calculate a cluster affinity score for each combination of candidate person cluster and clustered part detection, and greedily sequentially assign each clustered part detection to a candidate person cluster based on the cluster affinity score to generate person clusters. The apparatus also includes a pose generator to generate a pose for each person cluster.

Example 2 includes the apparatus of example 1, including or excluding optional features. In this example, the apparatus includes a hallucination suppressor to detect and suppress hallucinated parts in the clustered part detections, wherein clustered part detections having a structural compliance probability score below a threshold score are to be detected as hallucinated parts.

Example 3 includes the apparatus of any one of examples 1 to 2, including or excluding optional features. In this example, the significant head count is based on a unary probability for each detected head exceeding a threshold probability.

Example 4 includes the apparatus of any one of examples 1 to 3, including or excluding optional features. In this example, the detection clusterer is to cluster the refined part detections based on a spatial k-means clustering, wherein a refined part detection that is closer to a center of a generated spatial cluster is to be selected as a clustered part detection.

Example 5 includes the apparatus of any one of examples 1 to 4, including or excluding optional features. In this example, the cluster affinity score calculated for each combination is based on a received pairwise probability between the clustered part detection and one or more predecessor parts of the candidate person cluster.

Example 6 includes the apparatus of any one of examples 1 to 5, including or excluding optional features. In this example, the cluster affinity score calculated for each combination is based on a received pairwise probability between the clustered part detection and one or more predecessor parts on a same side of the candidate person cluster.

Example 7 includes the apparatus of any one of examples 1 to 6, including or excluding optional features. In this example, the detection clusterer is to cluster the refined part detections based on the estimated number of people with two additional people added to accommodate for partially visible people.

Example 8 includes the apparatus of any one of examples 1 to 7, including or excluding optional features. In this example, the refined part detections include part detections with unary probabilities exceeding a threshold probability.

Example 9 includes the apparatus of any one of examples 1 to 8, including or excluding optional features. In this example, the candidate selector and the sequential assigner are to process clustered part detections of an identical part class in parallel.

Example 10 includes the apparatus of any one of examples 1 to 9, including or excluding optional features. In this example, the apparatus includes a neural network trained to detect the body part candidates.

Example 11 is a method for estimating multi-person poses. The method includes estimating, via the processor, a number of people based on a significant head count of a plurality of received refined part detections. The method also includes clustering, via the processor, the refined part detections based on the estimated number of people to generate clustered part detections. The method further includes selecting, via the processor, a number of candidate person clusters for each clustered part detection based on proximity to the clustered part detection. The method also further includes calculating, via the processor, a cluster affinity score for each combination of candidate person cluster and clustered part detection, and greedily sequentially assigning, via the processor, each clustered part detection to a candidate person cluster based on the cluster affinity score to generate person clusters. The method further includes generating, via the processor, a pose for each person cluster.

Example 12 includes the method of example 11, including or excluding optional features. In this example, selecting the number of candidate person clusters and calculating the cluster affinity score is performed for clustered part detections of the same part class in parallel.

Example 13 includes the method of any one of examples 11 to 12, including or excluding optional features. In this example, clustering the refined part detections includes performing a spatial k-means clustering.

Example 14 includes the method of any one of examples 11 to 13, including or excluding optional features. In this example, the method includes detecting and suppressing, via the processor, hallucinated parts in the clustered part detections.

Example 15 includes the method of any one of examples 11 to 14, including or excluding optional features. In this example, calculating a cluster affinity score includes calculating co-occurrence probabilities for the combinations and greedily sequentially assigning the clustered part detections includes assigning the clustered part detections by type of body part from head down.

Example 16 includes the method of any one of examples 11 to 15, including or excluding optional features. In this example, selecting the number of candidate person clusters for each clustered part detection based on proximity to the clustered part detection includes selecting candidate person clusters within a threshold distance of each clustered part detection.

Example 17 includes the method of any one of examples 11 to 16, including or excluding optional features. In this example, calculating the cluster affinity score for each combination of candidate person cluster and clustered part detection is based on co-occurrence probabilities between each clustered part detection and a predecessor in each of the selected candidate person clusters.

Example 18 includes the method of any one of examples 11 to 17, including or excluding optional features. In this example, calculating the cluster affinity score for each combination of candidate person cluster and clustered part detection is based on co-occurrence probabilities between each clustered part detection and a predecessor in each of the selected candidate person clusters, wherein the predecessor in each of the selected candidate person clusters is on a same side of a body as each clustered part detection.

Example 19 includes the method of any one of examples 11 to 18, including or excluding optional features. In this example, clustering, via the processor, the refined part detections based on the estimated number of people to generate the clustered part detections includes clustering the refined part detections based on the estimated number of people with two additional people added to accommodate for partially visible people.

Example 20 includes the method of any one of examples 11 to 19, including or excluding optional features. In this example, the method includes training a neural network to detect body part candidates to be refined to generate the received refined part detections.

Example 21 is at least one computer readable medium for estimating multi-person poses having instructions stored therein that. The computer-readable medium includes instructions that direct the processor to receive body part candidates and refine the body part candidates to generate refined part detections. The computer-readable medium also includes instructions that direct the processor to estimate a number of people based on a significant head count of the refined part detections. The computer-readable medium further includes instructions that direct the processor to cluster the refined part detections based on the estimated number of people to generate clustered part detections. The computer-readable medium also further includes instructions that direct the processor to select a number of candidate person clusters for each clustered part detection based on proximity to the clustered part detection. The computer-readable medium also includes instructions that direct the processor to calculate a cluster affinity score for each combination of candidate person cluster and clustered part detection. The computer-readable medium also further includes instructions that direct the processor to greedily sequentially assign each clustered part detection to a candidate person cluster based on the cluster affinity score to generate person clusters. The computer-readable medium further includes instructions that direct the processor to generate a pose for each person cluster.

Example 22 includes the computer-readable medium of example 21, including or excluding optional features. In this example, the computer-readable medium includes instructions to process clustered part detections of a particular part type in parallel.

Example 23 includes the computer-readable medium of any one of examples 21 to 22, including or excluding optional features. In this example, the computer-readable medium includes instructions to detect a significant head based on a unary probability for a detected head exceeding a threshold probability.

Example 24 includes the computer-readable medium of any one of examples 21 to 23, including or excluding optional features. In this example, the computer-readable medium includes instructions to detect and suppress hallucinated parts based on a structural compliance probability score.

Example 25 includes the computer-readable medium of any one of examples 21 to 24, including or excluding optional features. In this example, the computer-readable medium includes instructions to cluster the refined part detections based on a spatial k-means clustering.

Example 26 includes the computer-readable medium of any one of examples 21 to 25, including or excluding optional features. In this example, the computer-readable medium includes instructions to calculate co-occurrence probabilities between each clustered part detection and a predecessor in each of the selected candidate person clusters.

Example 27 includes the computer-readable medium of any one of examples 21 to 26, including or excluding optional features. In this example, the computer-readable medium includes instructions to calculate co-occurrence probabilities between each clustered part detection and a predecessor on a same body side in each of the selected candidate person clusters.

Example 28 includes the computer-readable medium of any one of examples 21 to 27, including or excluding optional features. In this example, the computer-readable medium includes instructions to cluster the refined part detections based on the estimated number of people with two additional people added to accommodate for partially visible people.

Example 29 includes the computer-readable medium of any one of examples 21 to 28, including or excluding optional features. In this example, the computer-readable medium includes instructions to refine the body part candidates based on non-maximal suppression.

Example 30 includes the computer-readable medium of any one of examples 21 to 29, including or excluding optional features. In this example, the computer-readable medium includes instructions to refine the body part candidates based on unary probability thresholding.

Example 31 is a system for estimating poses. The system includes a person estimator to estimate a number of people based on a significant head count of a plurality of received refined part detections. The system also includes a detection clusterer to cluster the refined part detections based on the estimated number of people to generate clustered part detections. The system further includes a candidate selector to select a number of candidate person clusters for each clustered part detection based on proximity to the clustered part detection. The system also further includes a sequential assigner to calculate a cluster affinity score for each combination of candidate person cluster and clustered part detection, and greedily sequentially assign each clustered part detection to a candidate person cluster based on the cluster affinity score to generate person clusters. The system further includes a pose generator to generate a pose for each person cluster.

Example 32 includes the system of example 31, including or excluding optional features. In this example, the system includes a hallucination suppressor to detect and suppress hallucinated parts in the clustered part detections, wherein clustered part detections having a structural compliance probability score below a threshold score are to be detected as hallucinated parts.

Example 33 includes the system of any one of examples 31 to 32, including or excluding optional features. In this example, the significant head count is based on a unary probability for each detected head exceeding a threshold probability.

Example 34 includes the system of any one of examples 31 to 33, including or excluding optional features. In this example, the detection clusterer is to cluster the refined part detections based on a spatial k-means clustering, wherein a refined part detection that is closer to a center of a generated spatial cluster is to be selected as a clustered part detection.

Example 35 includes the system of any one of examples 31 to 34, including or excluding optional features. In this example, the cluster affinity score calculated for each combination is based on a received pairwise probability between the clustered part detection and one or more predecessor parts of the candidate person cluster.

Example 36 includes the system of any one of examples 31 to 35, including or excluding optional features. In this example, the cluster affinity score calculated for each combination is based on a received pairwise probability between the clustered part detection and one or more predecessor parts on a same side of the candidate person cluster.

Example 37 includes the system of any one of examples 31 to 36, including or excluding optional features. In this example, the detection clusterer is to cluster the refined part detections based on the estimated number of people with two additional people added to accommodate for partially visible people.

Example 38 includes the system of any one of examples 31 to 37, including or excluding optional features. In this example, the refined part detections include part detections with unary probabilities exceeding a threshold probability.

Example 39 includes the system of any one of examples 31 to 38, including or excluding optional features. In this example, the candidate selector and the sequential assigner are to process clustered part detections of an identical part class in parallel.

Example 40 includes the system of any one of examples 31 to 39, including or excluding optional features. In this example, the system includes a neural network trained to detect the body part candidates.

Example 41 is a system for estimating poses. The system includes means for estimating a number of people based on a significant head count of a plurality of received refined part detections. The system also includes means for clustering the refined part detections based on the estimated number of people to generate clustered part detections. The system further includes means for selecting a number of candidate person clusters for each clustered part detection based on proximity to the clustered part detection. The system also further includes means for calculating a cluster affinity score for each combination of candidate person cluster and clustered part detection, and greedily sequentially assign each clustered part detection to a candidate person cluster based on the cluster affinity score to generate person clusters. The system further includes means for generating a pose for each person cluster.

Example 42 includes the system of example 41, including or excluding optional features. In this example, the system includes means for detecting and suppressing hallucinated parts in the clustered part detections, wherein clustered part detections having a structural compliance probability score below a threshold score are to be detected as hallucinated parts.

Example 43 includes the system of any one of examples 41 to 42, including or excluding optional features. In this example, the significant head count is based on a unary probability for each detected head exceeding a threshold probability.

Example 44 includes the system of any one of examples 41 to 43, including or excluding optional features. In this example, the means for clustering the refined part detections is to cluster the refined part detections based on a spatial k-means clustering, wherein a refined part detection that is closer to a center of a generated spatial cluster is to be selected as a clustered part detection.

Example 45 includes the system of any one of examples 41 to 44, including or excluding optional features. In this example, the cluster affinity score calculated for each combination is based on a received pairwise probability between the clustered part detection and one or more predecessor parts of the candidate person cluster.

Example 46 includes the system of any one of examples 41 to 45, including or excluding optional features. In this example, the cluster affinity score calculated for each combination is based on a received pairwise probability between the clustered part detection and one or more predecessor parts on a same side of the candidate person cluster.

Example 47 includes the system of any one of examples 41 to 46, including or excluding optional features. In this example, the means for clustering the refined part detections is to cluster the refined part detections based on the estimated number of people with two additional people added to accommodate for partially visible people.

Example 48 includes the system of any one of examples 41 to 47, including or excluding optional features. In this example, the refined part detections include part detections with unary probabilities exceeding a threshold probability.

Example 49 includes the system of any one of examples 41 to 48, including or excluding optional features. In this example, the means for selecting a number of candidate person clusters and the means for calculating a cluster affinity score are to process clustered part detections of an identical part class in parallel.

Example 50 includes the system of any one of examples 41 to 49, including or excluding optional features. In this example, the system includes means to detect the body part candidates.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for estimating poses, comprising a processor to:
   estimate a number of people based on a significant head count of a plurality of received refined part detections refined based on unary probabilities of part detections exceeding a threshold unary probability;
   cluster the refined part detections based on the estimated number of people to generate clustered part detections;
   select a number of candidate person clusters for each clustered part detection based on proximity to the clustered part detection;
   calculate a cluster affinity score based on pairwise probabilities for each combination of a predecessor part of the candidate person cluster and clustered part detection, and greedily sequentially assign each clustered part detection to a candidate person cluster based on the cluster affinity score to generate person clusters; and
   generate a pose for each person cluster.

2. The apparatus of claim 1, wherein the processor is to detect and suppress hallucinated parts in the clustered part detections, wherein clustered part detections having a structural compliance probability score below a threshold score are to be detected as hallucinated parts.

3. The apparatus of claim 1, wherein the significant head count is based on a unary probability for each detected head exceeding a threshold probability.

4. The apparatus of claim 1, wherein the processor is to cluster the refined part detections based on a spatial k-means clustering, wherein a refined part detection that is closer to a center of a generated spatial cluster is to be selected as a clustered part detection.

5. The apparatus of claim 1, wherein the cluster affinity score calculated for each combination is based on a received pairwise probability between the clustered part detection and one or more predecessor parts of the candidate person cluster.

6. The apparatus of claim 1, wherein the cluster affinity score calculated for each combination is based on a received pairwise probability between the clustered part detection and one or more predecessor parts on a same side of the candidate person cluster.

7. The apparatus of claim 1, wherein the processor is to process refined part detections of a part class in parallel.

8. The apparatus of claim 1, wherein the processor is to process clustered part detections of an identical part class in parallel.

9. The apparatus of claim 1, wherein the refined part detections comprise part detections with unary probabilities exceeding a threshold probability.

10. The apparatus of claim 1, comprising a neural network trained to detect the body part candidates.

11. A method for estimating multi-person poses, comprising:
  estimating, via the processor, a number of people based on a significant head count of a plurality of received refined part detections refined based on unary probabilities of part detections exceeding a threshold unary probability;
  clustering, via the processor, the refined part detections based on the estimated number of people to generate clustered part detections;
  selecting, via the processor, a number of candidate person clusters for each clustered part detection based on proximity to the clustered part detection;
  calculating, via the processor, a cluster affinity score based on pairwise probabilities for each combination of a predecessor part of the candidate person cluster and clustered part detection, and greedily sequentially assigning, via the processor, each clustered part detection to a candidate person cluster based on the cluster affinity score to generate person clusters; and
  generating, via the processor, a pose for each person cluster.

12. The method of claim 11, wherein selecting the number of candidate person clusters and calculating the cluster affinity score is performed for clustered part detections of the same part class in parallel.

13. The method of claim 11, wherein clustering the refined part detections comprises performing a spatial k-means clustering.

14. The method of claim 11, comprising detecting and suppressing, via the processor, hallucinated parts in the clustered part detections.

15. The method of claim 11, wherein calculating a cluster affinity score comprises calculating co-occurrence probabilities for the combinations and greedily sequentially assigning the clustered part detections comprises assigning the clustered part detections by type of body part from head down.

16. At least one computer readable medium for estimating multi-person poses having instructions stored therein that, in response to being executed on a computing device, cause the computing device to:
  receive body part candidates and
  refine the body part candidates based on unary probabilities of part detections exceeding a threshold unary probability to generate refined part detections;
  estimate a number of people based on a significant head count of the refined part detections;
  cluster the refined part detections based on the estimated number of people to generate clustered part detections;
  select a number of candidate person clusters for each clustered part detection based on proximity to the clustered part detection;
  calculate a cluster affinity score based on pairwise probabilities for each combination of a predecessor part of the candidate person cluster and clustered part detection;
  greedily sequentially assign each clustered part detection to a candidate person cluster based on the cluster affinity score to generate person clusters; and
  generate a pose for each person cluster.

17. The at least one computer readable medium of claim 16, comprising instructions to process clustered part detections of a particular part type in parallel.

18. The at least one computer readable medium of claim 16, comprising instructions to detect a significant head based on a unary probability for a detected head exceeding a threshold probability.

19. The at least one computer readable medium of claim 16, comprising instructions to detect and suppress hallucinated parts based on a structural compliance probability score.

20. The at least one computer readable medium of claim 16, comprising instructions to cluster the refined part detections based on a spatial k-means clustering.

* * * * *